Aug. 7, 1945.   C. A. BICKEL   2,381,422
SENSITIVE PRECISION LATHE
Filed Oct. 31, 1939   35 Sheets-Sheet 2

INVENTOR
CLIFFORD A. BICKEL
BY
ATTORNEYS

Aug. 7, 1945.    C. A. BICKEL    2,381,422
SENSITIVE PRECISION LATHE
Filed Oct. 31, 1939    35 Sheets-Sheet 3
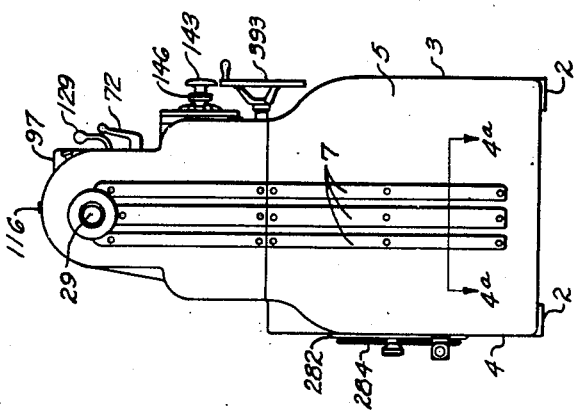
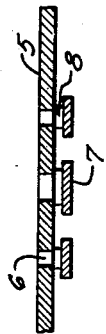
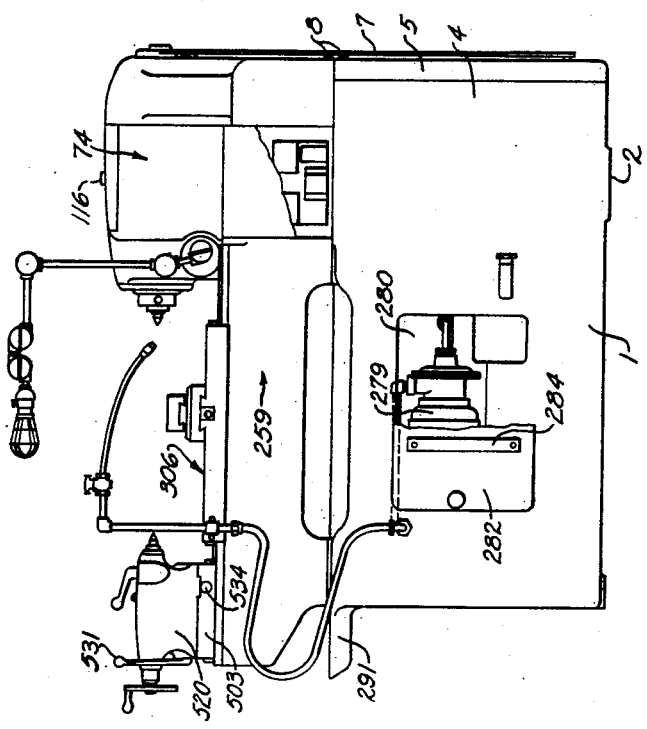
INVENTOR.
CLIFFORD A. BICKEL
BY
ATTORNEY.

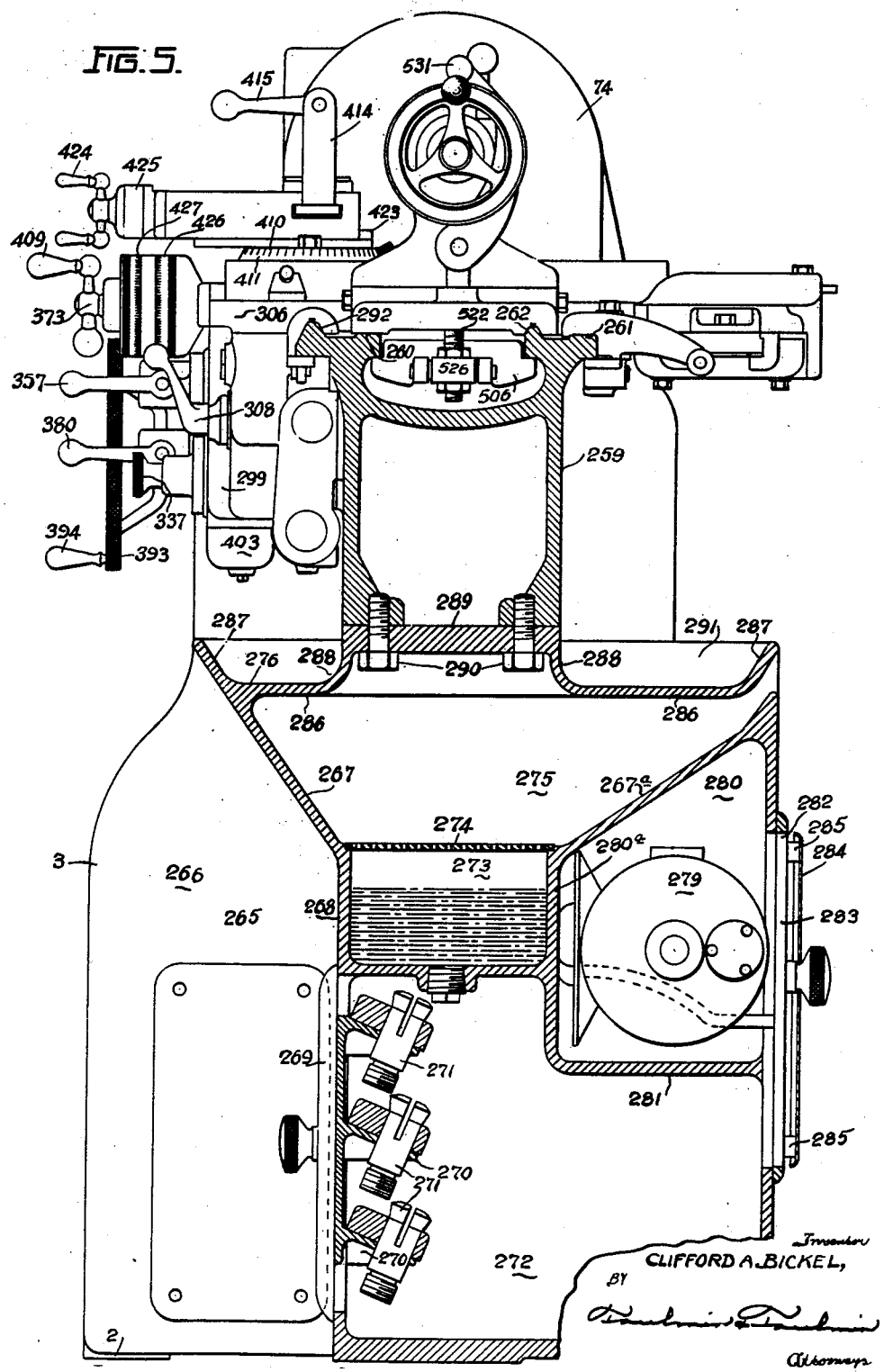

Aug. 7, 1945.   C. A. BICKEL   2,381,422
SENSITIVE PRECISION LATHE
Filed Oct. 31, 1939   35 Sheets-Sheet 5
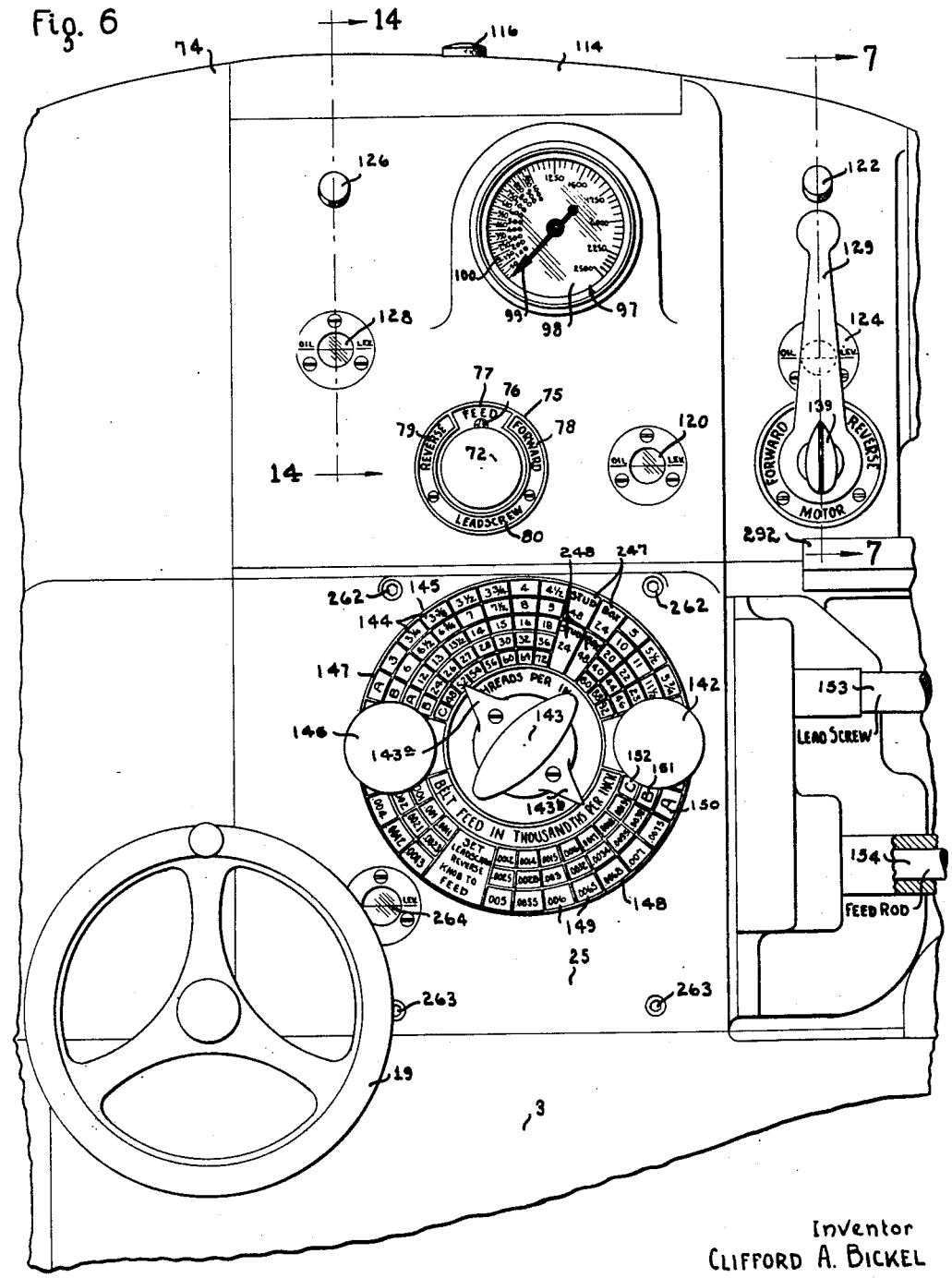
Inventor
CLIFFORD A. BICKEL
by
Attorneys Aug. 7, 1945.  C. A. BICKEL  2,381,422
SENSITIVE PRECISION LATHE
Filed Oct. 31, 1939   35 Sheets-Sheet 6

Inventor
CLIFFORD A. BICKEL
by
Attorneys

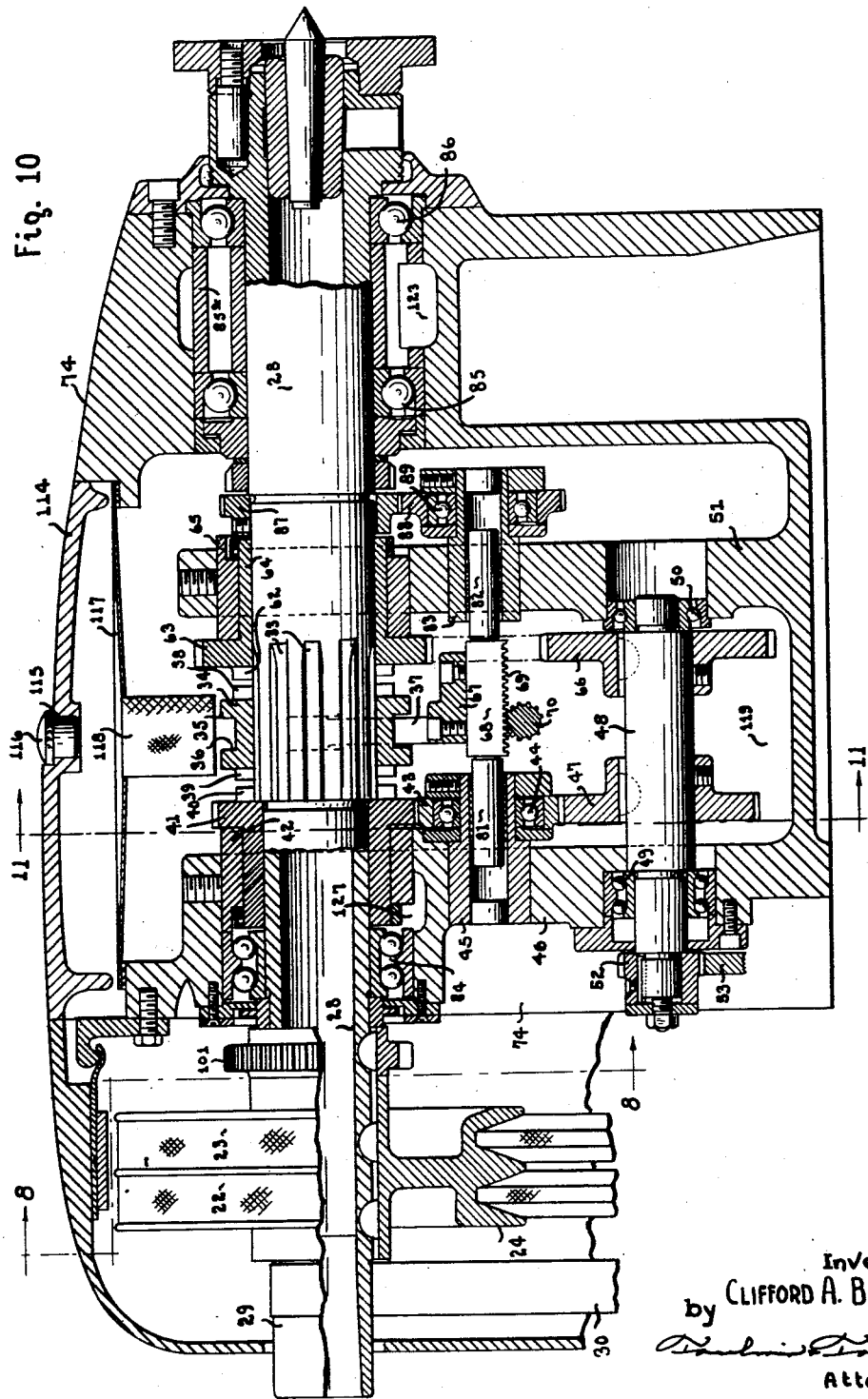

Aug. 7, 1945.  C. A. BICKEL  2,381,422
SENSITIVE PRECISION LATHE
Filed Oct. 31, 1939   35 Sheets-Sheet 8

Inventor
CLIFFORD A. BICKEL
by
Attorneys

Aug. 7, 1945.  C. A. BICKEL  2,381,422
SENSITIVE PRECISION LATHE
Filed Oct. 31, 1939  35 Sheets—Sheet 9

Inventor
CLIFFORD A. BICKEL
by
Attorneys

Aug. 7, 1945. C. A. BICKEL 2,381,422
SENSITIVE PRECISION LATHE
Filed Oct. 31, 1939 35 Sheets-Sheet 11

Inventor
CLIFFORD A. BICKEL
by
Attorneys

Aug. 7, 1945.    C. A. BICKEL    2,381,422
SENSITIVE PRECISION LATHE
Filed Oct. 31, 1939    35 Sheets-Sheet 14

Inventor
CLIFFORD A. BICKEL
Attorneys

Aug. 7, 1945.  C. A. BICKEL  2,381,422
SENSITIVE PRECISION LATHE
Filed Oct. 31, 1939  35 Sheets-Sheet 15

INVENTOR
CLIFFORD A. BICKEL
BY
ATTORNEYS

Aug. 7, 1945.    C. A. BICKEL    2,381,422
SENSITIVE PRECISION LATHE
Filed Oct. 31, 1939    35 Sheets-Sheet 16

INVENTOR
CLIFFORD A. BICKEL
BY
ATTORNEYS

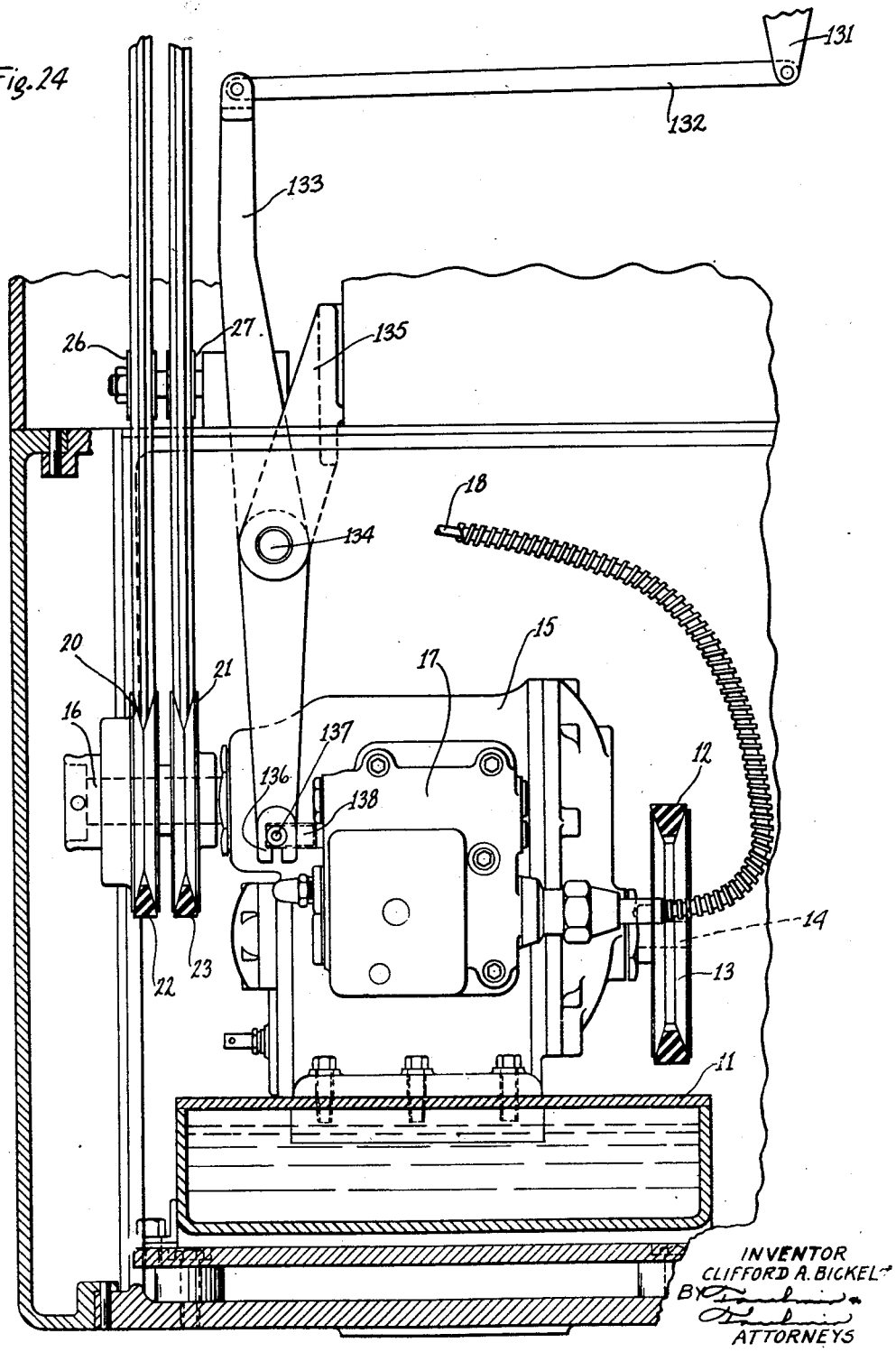

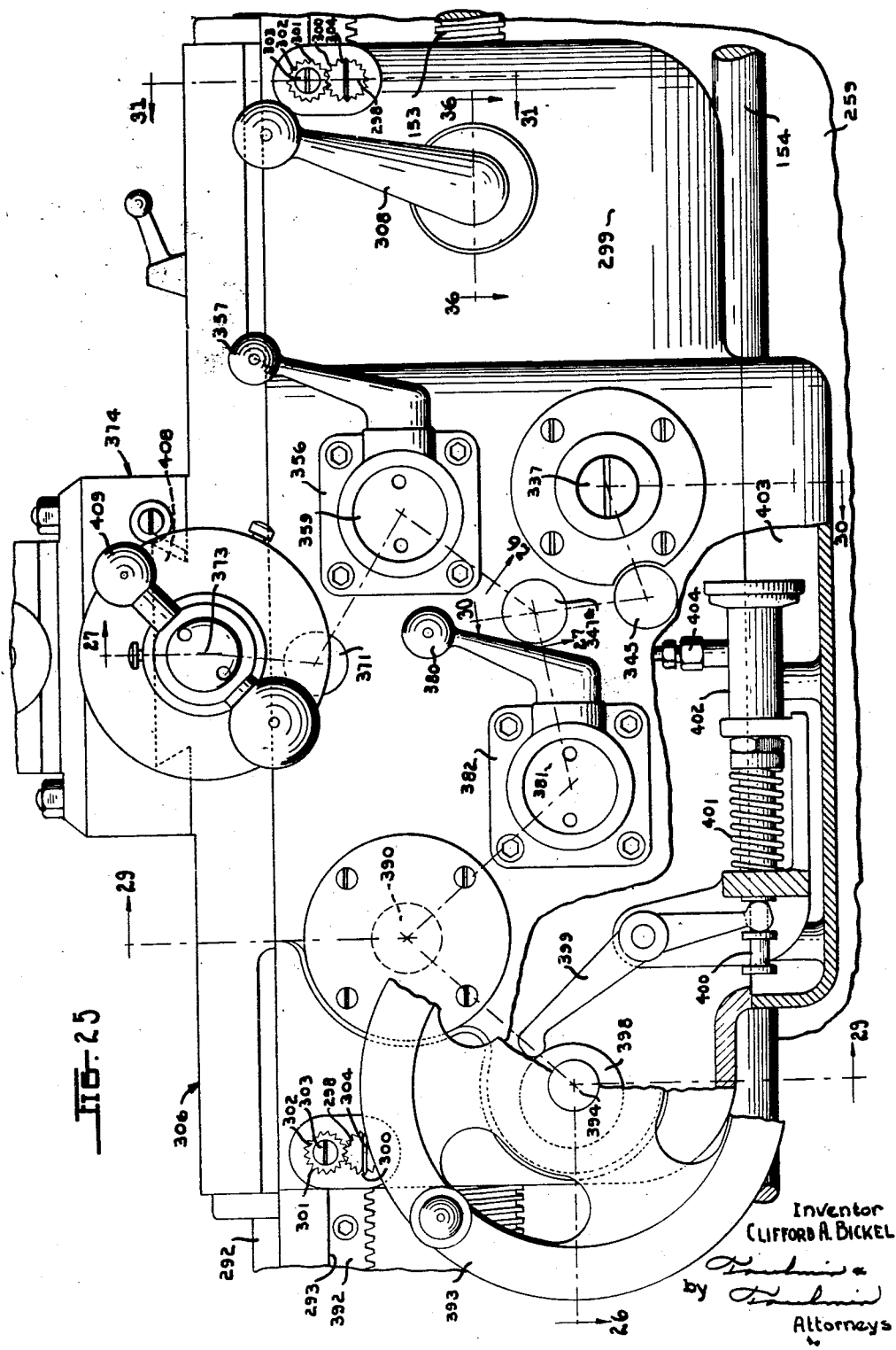

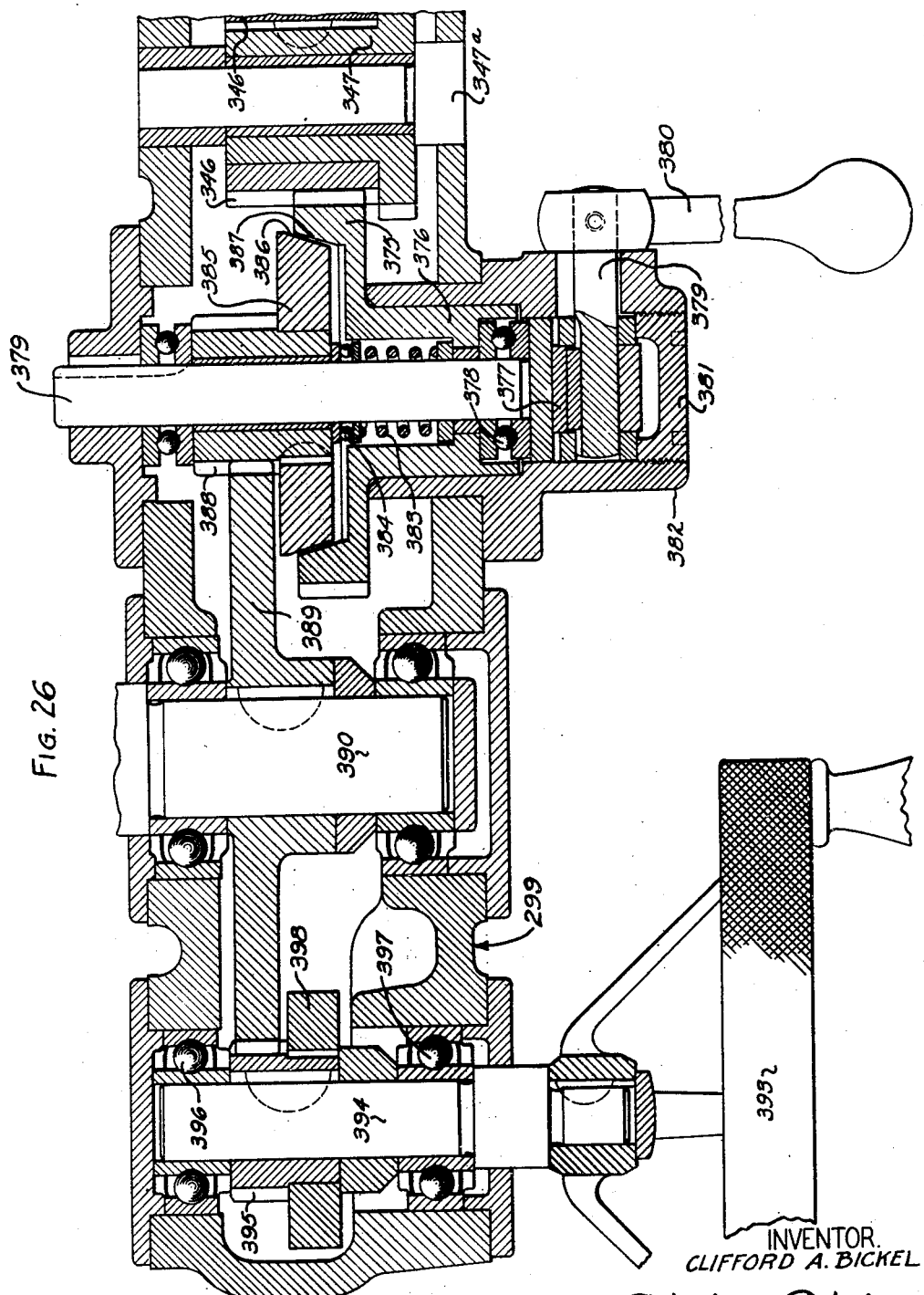

Aug. 7, 1945.                     C. A. BICKEL                    2,381,422
                            SENSITIVE PRECISION LATHE
                            Filed Oct. 31, 1939        35 Sheets-Sheet 20
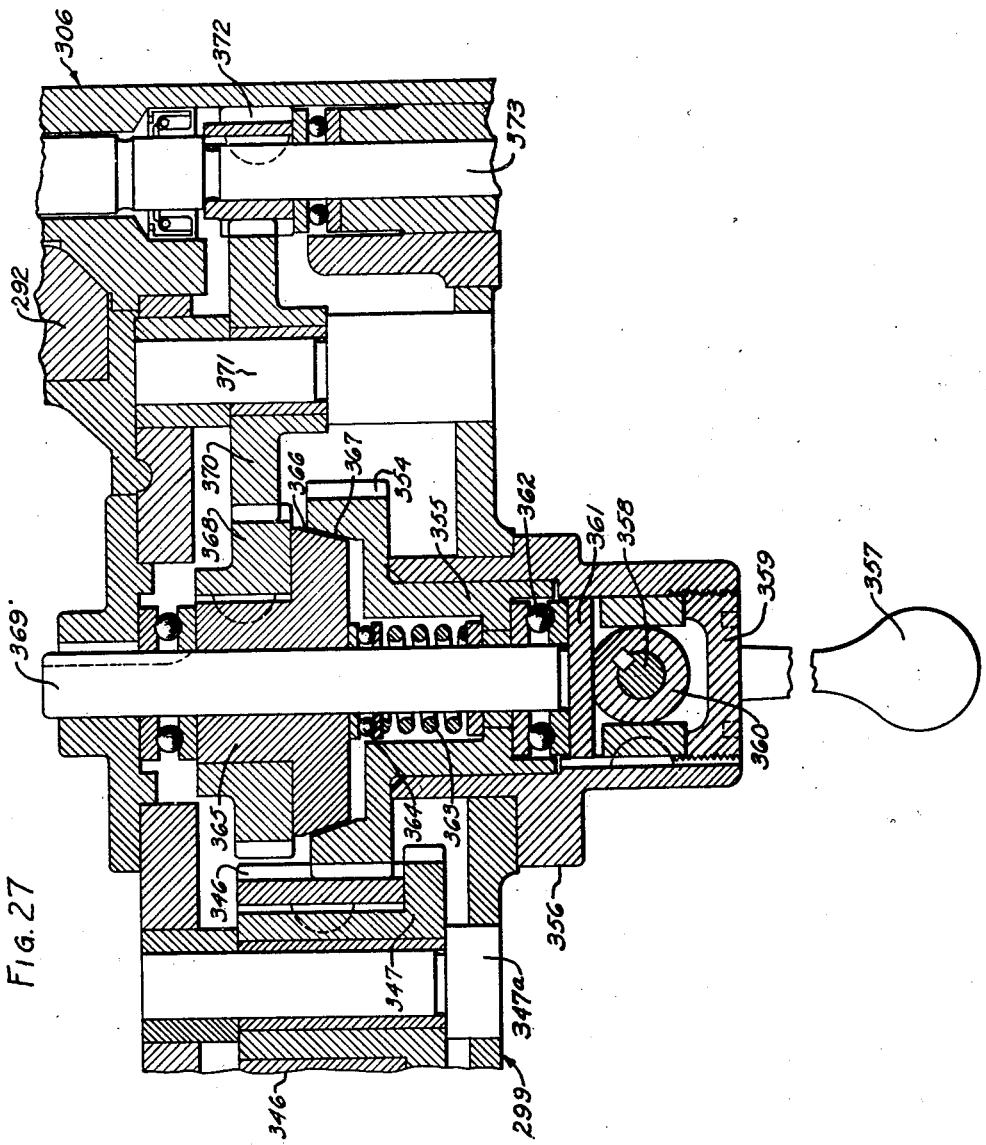
INVENTOR.
CLIFFORD A. BICKEL
BY
ATTORNEYS

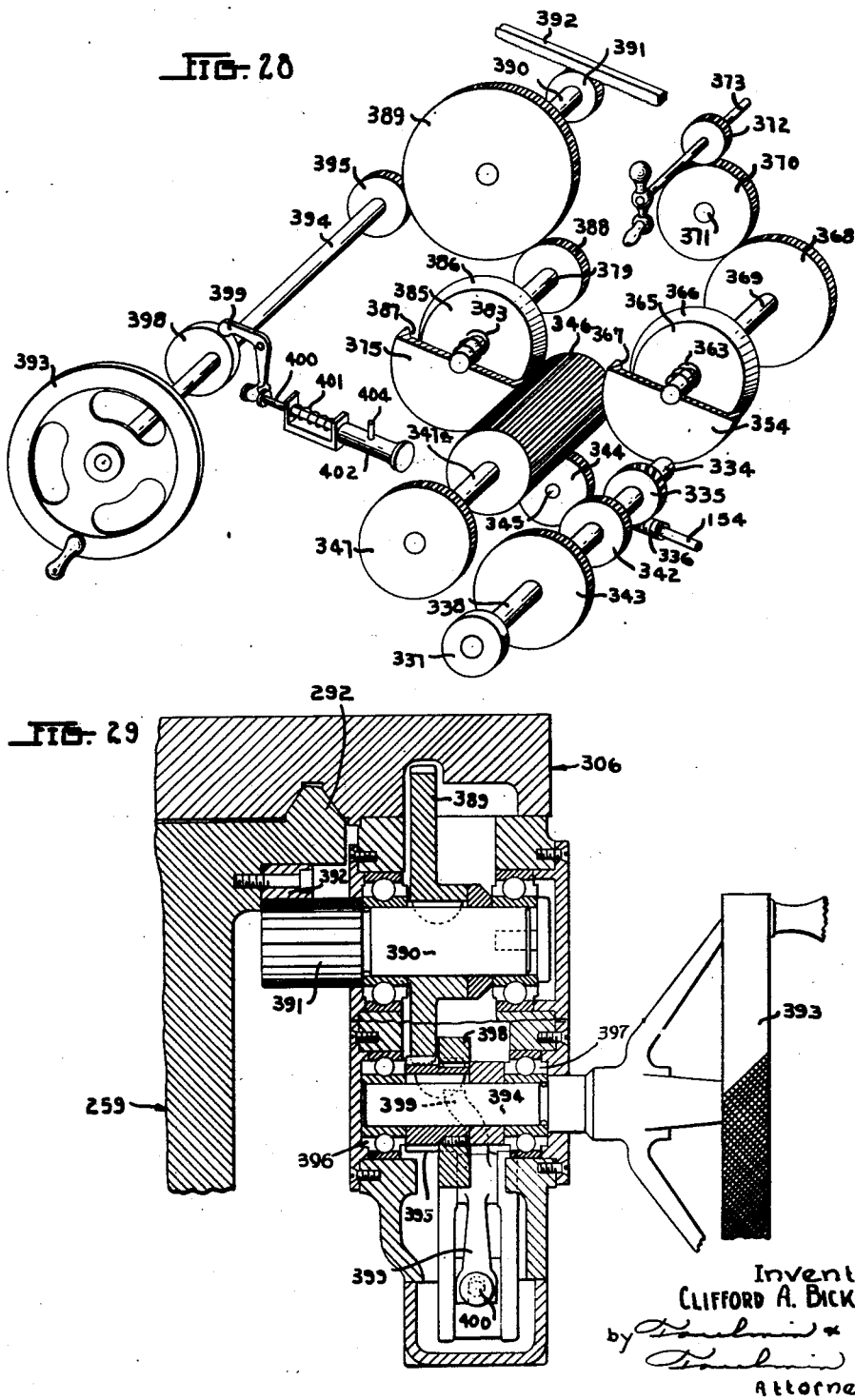

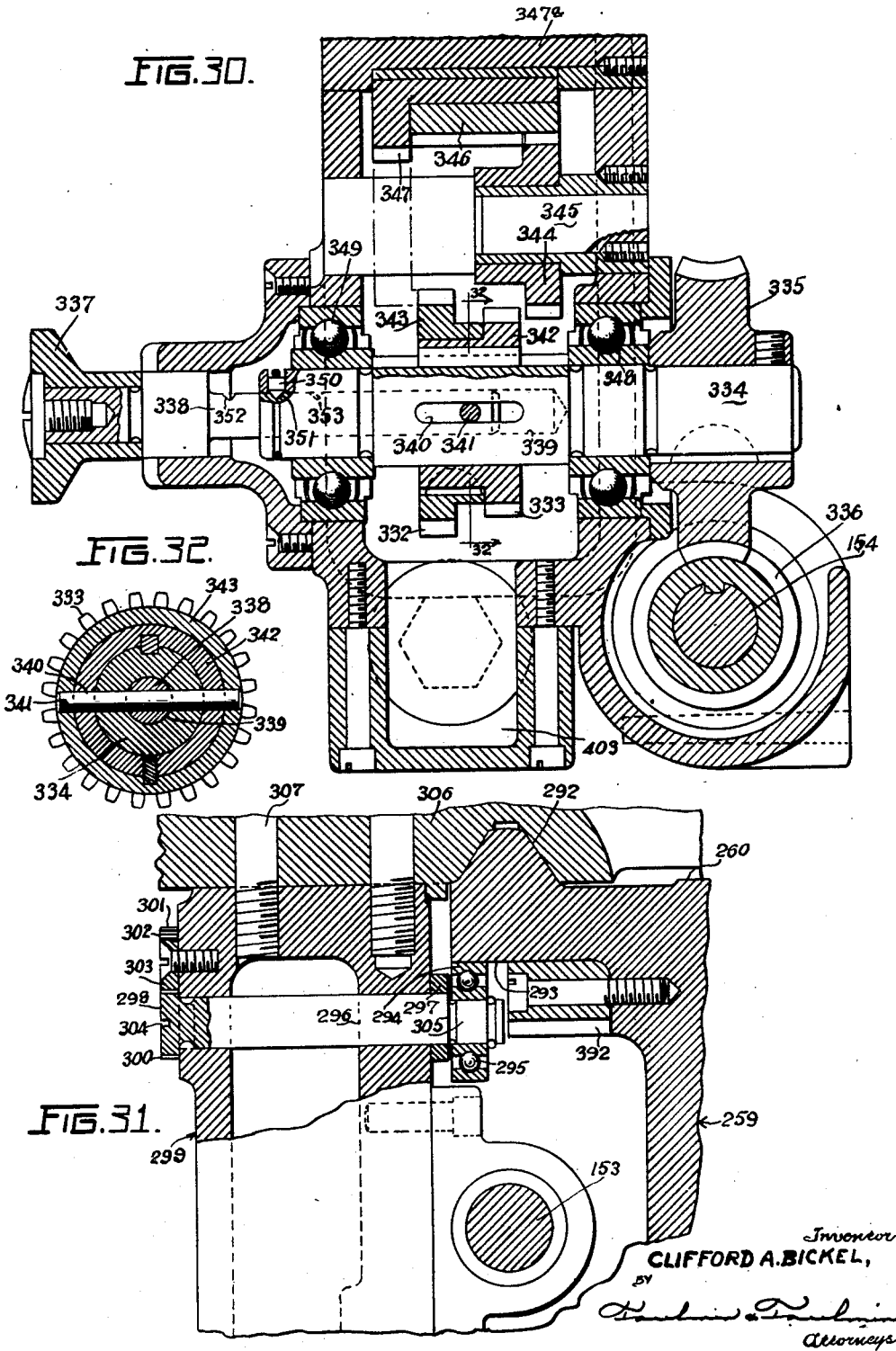

Aug. 7, 1945.　　　　　C. A. BICKEL　　　　　2,381,422
SENSITIVE PRECISION LATHE
Filed Oct. 31, 1939　　　35 Sheets-Sheet 24
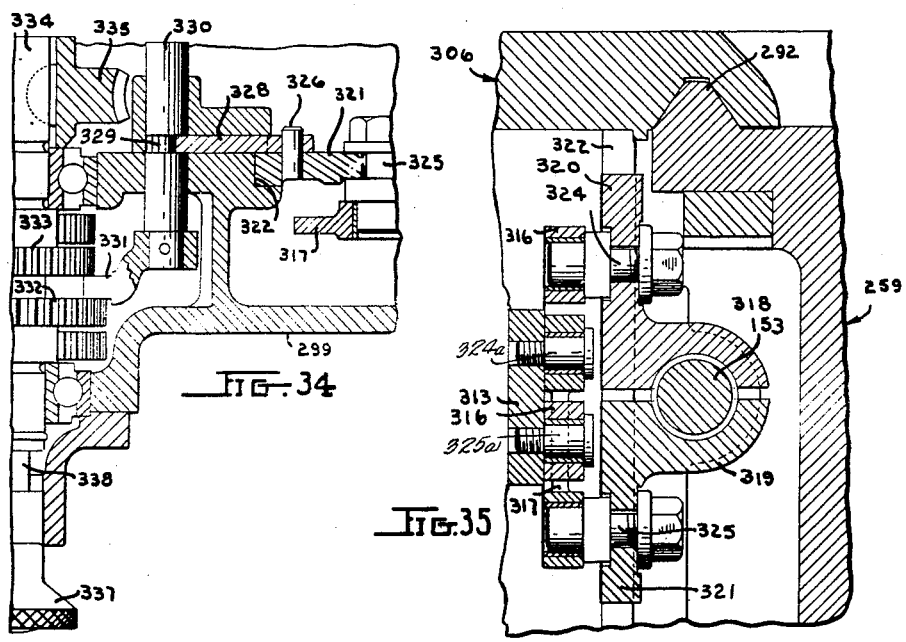
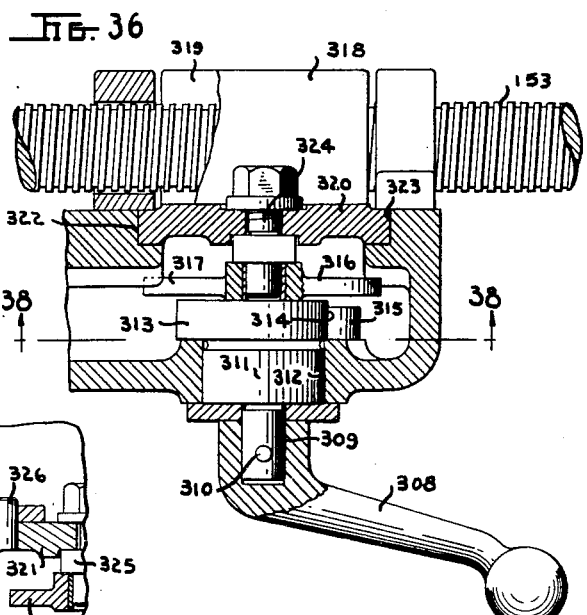
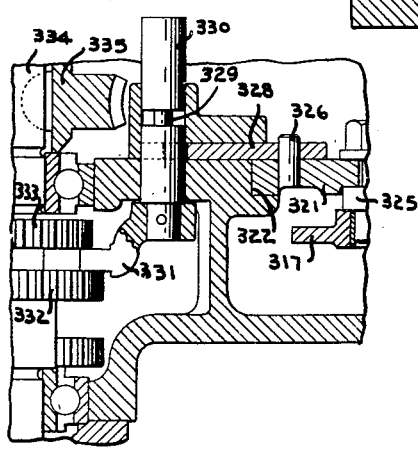
Inventor
CLIFFORD A. BICKEL
by
Attorneys Aug. 7, 1945.  C. A. BICKEL  2,381,422
SENSITIVE PRECISION LATHE
Filed Oct. 31, 1939    35 Sheets-Sheet 25

Inventor
CLIFFORD A. BICKEL
Attorneys

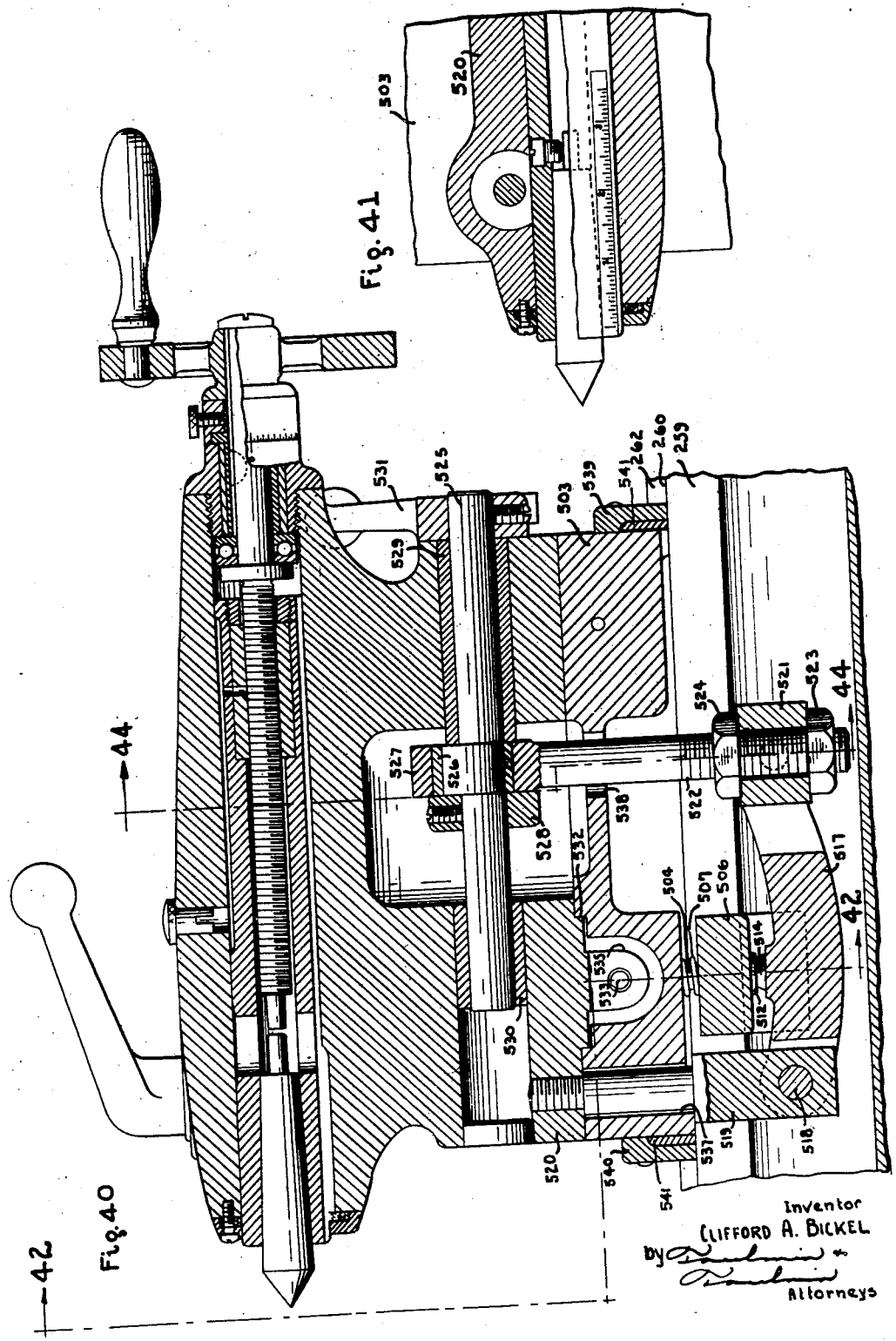

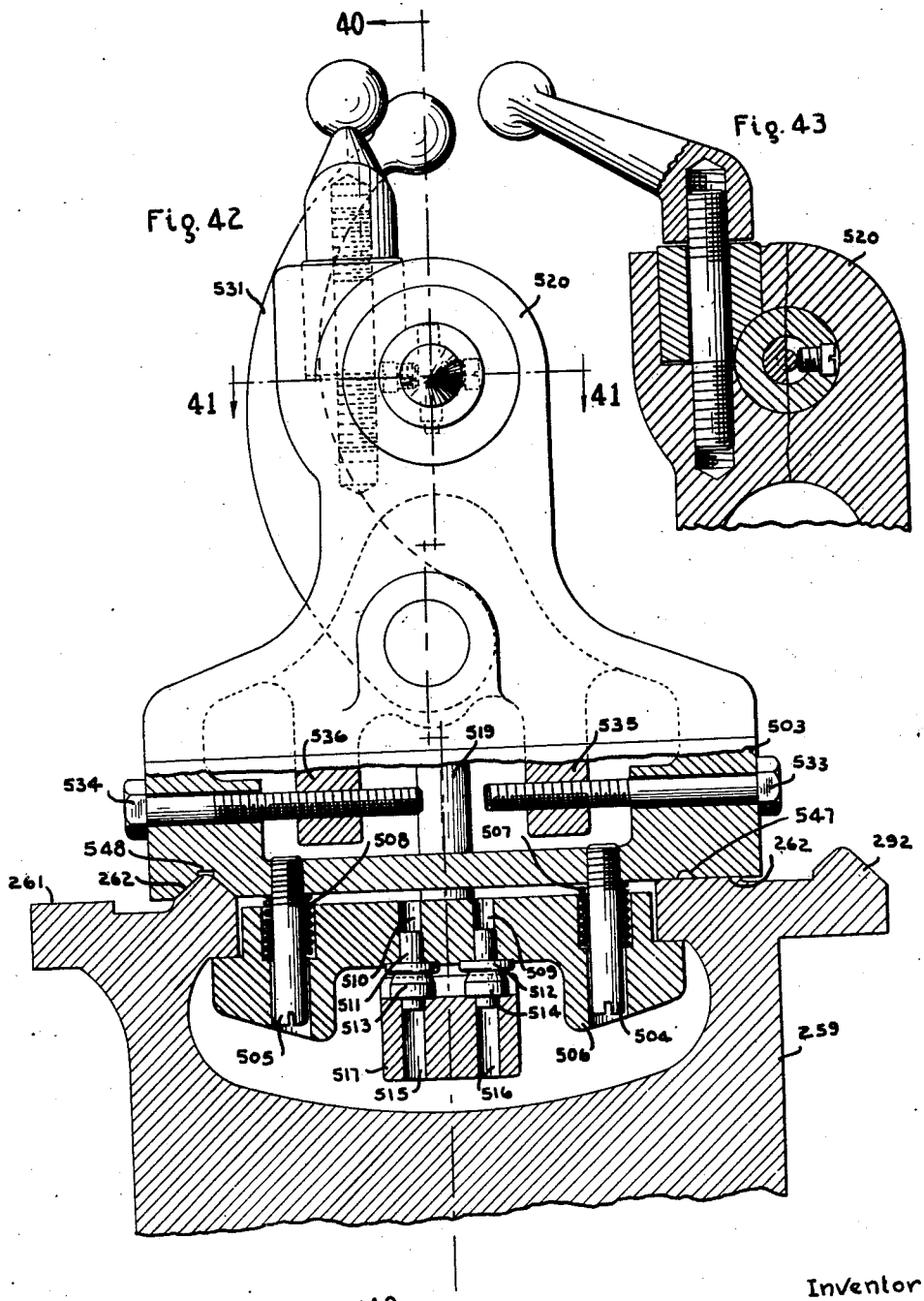

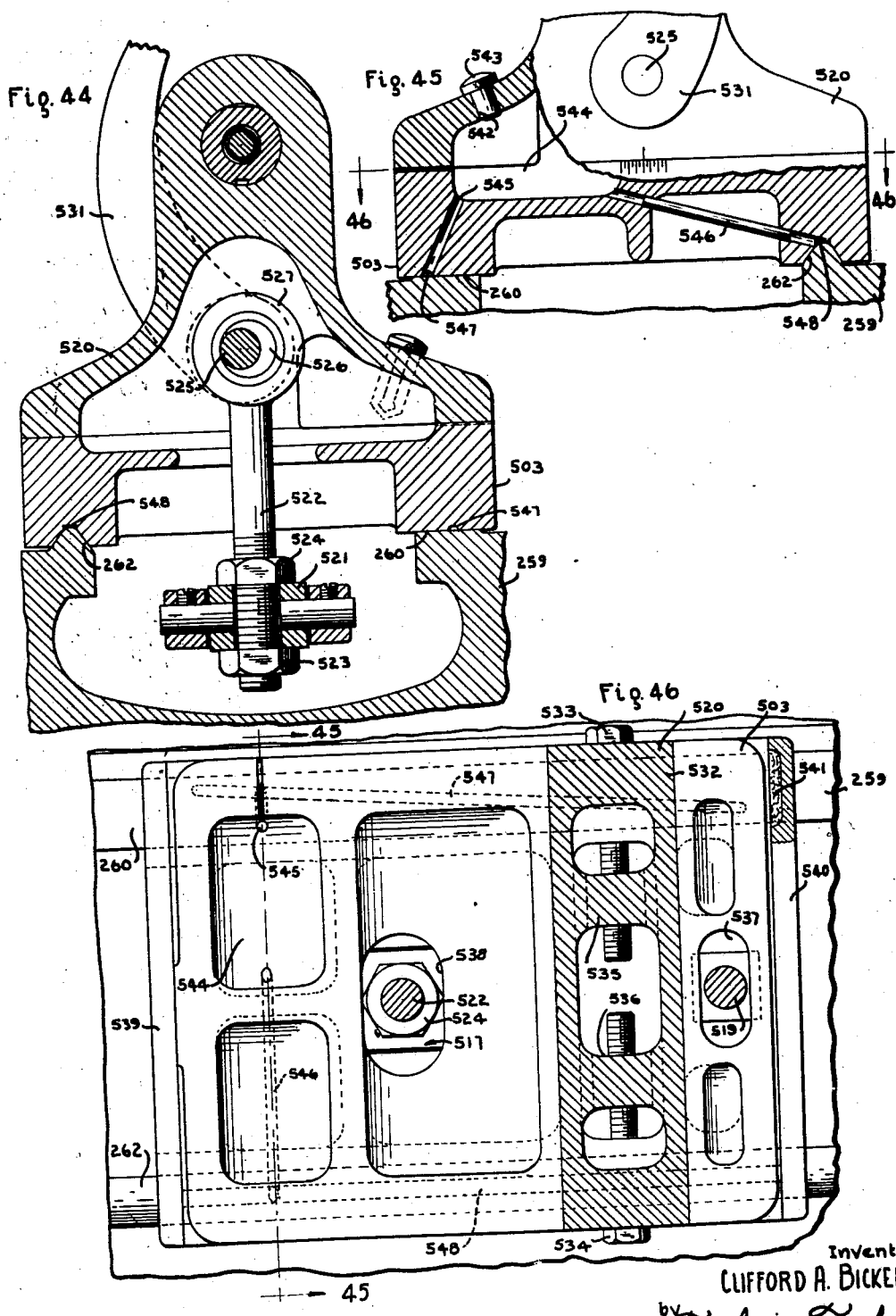

Aug. 7, 1945.                C. A. BICKEL                2,381,422
                        SENSITIVE PRECISION LATHE
                  Filed Oct. 31, 1939          35 Sheets-Sheet 29

INVENTOR
CLIFFORD A. BICKEL
ATTORNEYS

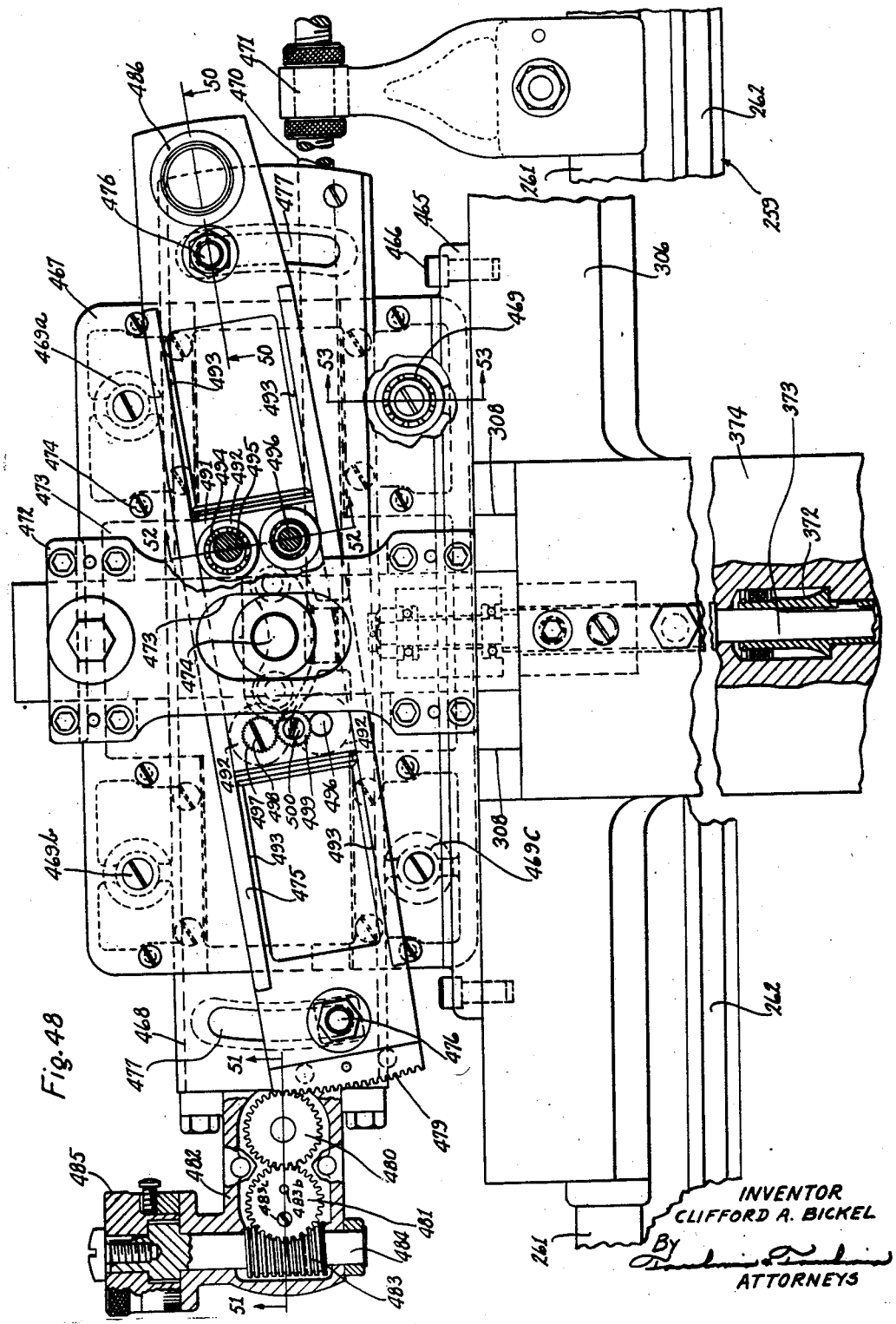

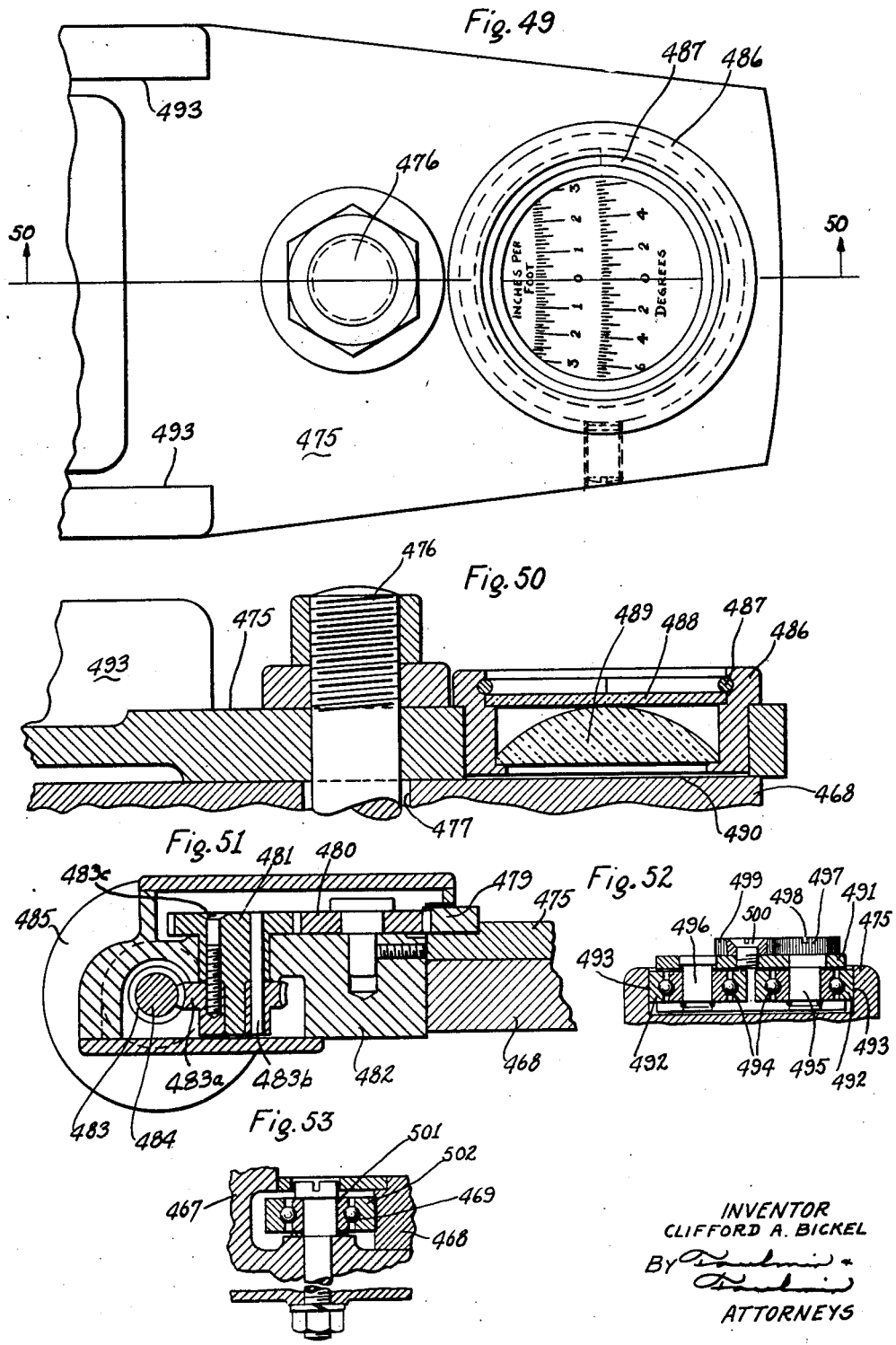

Aug. 7, 1945.           C. A. BICKEL           2,381,422
                    SENSITIVE PRECISION LATHE
             Filed Oct. 31, 1939      35 Sheets-Sheet 32

Inventor
CLIFFORD A. BICKEL
by
Attorneys

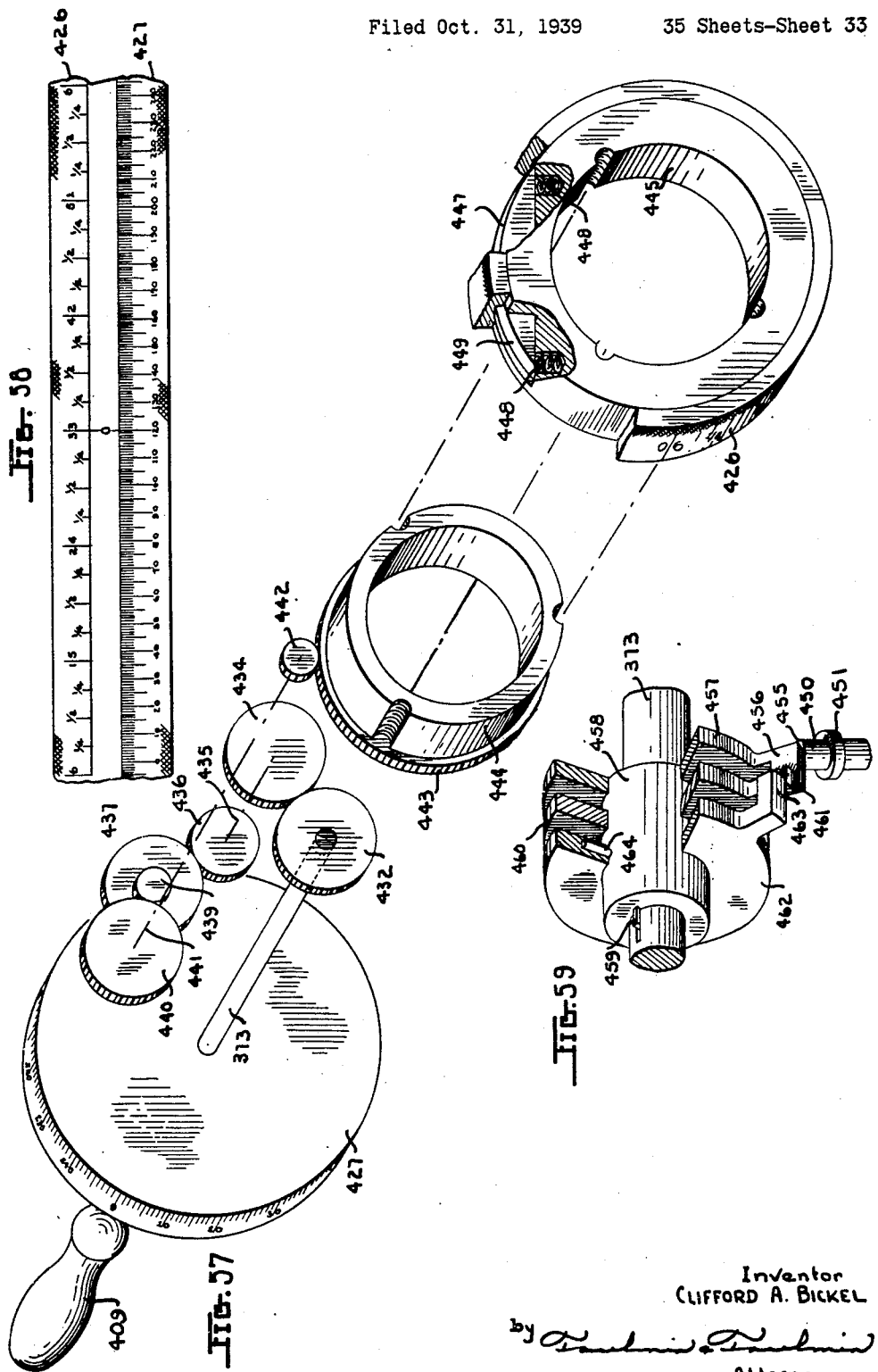

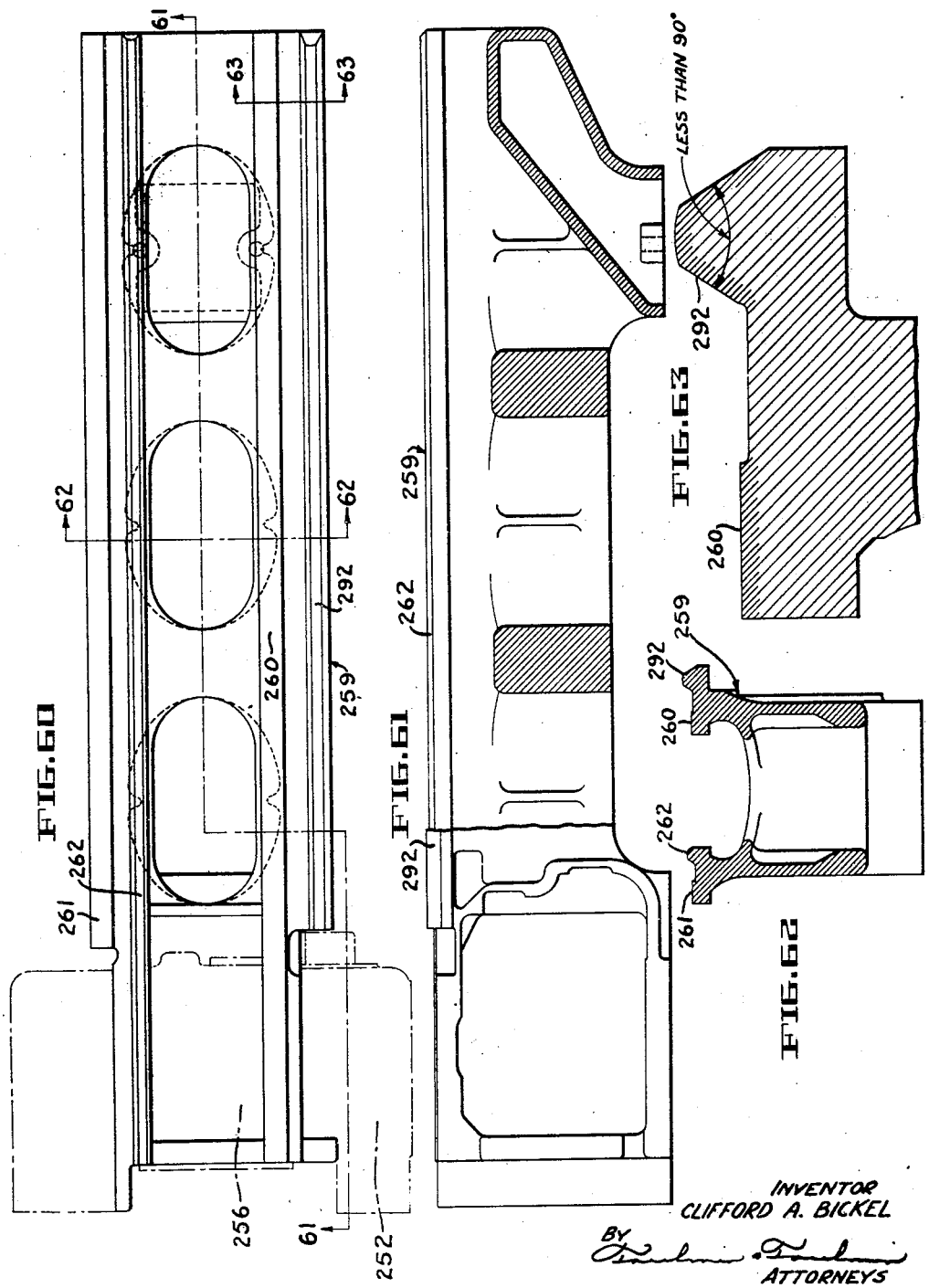

Aug. 7, 1945.  C. A. BICKEL  2,381,422
SENSITIVE PRECISION LATHE
Filed Oct. 31, 1939  35 Sheets-Sheet 35

INVENTOR
CLIFFORD A. BICKEL
BY
ATTORNEYS

Patented Aug. 7, 1945

2,381,422

UNITED STATES PATENT OFFICE 2,381,422

SENSITIVE PRECISION LATHE

Clifford A. Bickel, Sidney, Ohio, assignor to The Monarch Machine Tool Co., Sidney, Ohio, a corporation of Ohio Application October 31, 1939, Serial No. 302,194

11 Claims. (Cl. 82—2)

My invention relates to lathes.

It is the object of this invention to provide a very sensitive precision lathe with an almost unlimited range of gearless, stepless spindle speeds capable of both forward and reverse movement.

It is a further object to provide a wide range of threads and feeds through a quick change gear box which can be operated by one hand.

It is an object to provide a lathe that can be operated either from a sitting or standing position.

It is an object of this invention to provide an endless belt automatically used for all feeds from spindle to gear box, but reserving and preserving the accurate gear train solely for thread chasing.

It is an object of this invention to provide a common drive means for both the lead screw and the feed rod with means of selectively changing the speed of driving and of selectively rendering a portion of the driving mechanism for the lead screw inoperative during the period that the feed rod is being actuated.

It is a further object to provide a lathe in which all of the control levers and control knobs could be reached and operated by the operator without moving from a position in front of the lathe.

It is an object of the invention to provide a lathe in which the speed could be varied from substantially zero to over 2500 revolutions per minute.

It is an object to provide a lathe in which the operator could select any desired thread or feed either in a forward or reverse direction.

It is a further object to provide a hand control enabling the operator to instantly start, stop or reverse the headstock spindle in any operating speed.

It is an object of this invention to provide a headstock in which the headstock spindle is provided with a selective gear clutch rotating with the spindle and positioned by the bearings that support the spindle, and so arranged with respect to the gears that neither of the two gear trains is operative until the clutch is moved into position.

The advantage of this is to prevent, particularly at high speeds, the chatter of the gears if they are in mesh and to prevent the wear on the gearing as a result of unnecessary operation when the gearing is not being used. According to the present invention, when the driving belt is operating the spindle, it can operate the feed belt without operating the gearing and the headstock.

The further object of this headstock construction is to provide gearing associated with the spindle clutch so that the operator can select whether he will drive through the lead screw for chasing the threads or whether he will feed through the feed rod for actuating the carriage and cross slide. There is further provided a selector button or lever for shifting the spindle clutch, which reverses the direction of movement of the carriage.

It is a further object to provide a compact drive direct from the spindle of the headstock to a tachometer.

It is a further purpose to put this on the headstock casing directly opposite the operator.

It is a further object to provide associated with this general location of the tachometer the oil sight gauges for indicating the state of operation of various elements of the mechanism.

It is an object to provide the starting and stopping button for the driving motor in association with the hydraulic drive control for positioning this drive from neutral to a position in forward or reverse.

It is an object to provide a control for the variable speed transmission.

It is an object to provide a novel means of lubrication of ball bearing supports for the several parts of the headstock with means of constantly determining the state of that lubrication in order to insure adequate lubricant due to the high speeds and accurate mechanism employed.

It is an object to provide a common reservoir and filler for the spindle clutch and the associated gearing.

It is an object to provide independent reservoirs and means of lubrication for the front and rear main spindle bearings.

It is an object to provide a headstock spindle lock so as to hold the spindle while mounting any desired mechanism in relation to the spindle.

It is a further object to provide in the headstock the combination of the spindle, spindle drive, the drive for the lead screw and the feed rod, means for reversing the direction of the feed rod, and associated means for reversing the spindle direct through the hydraulic power unit.

It is a further object of this invention to provide a gear box in which there is separate feed rod and lead screw thread chasing means, and means to select the drives for the lead screw chasing means and the feed rod, together with a novel means of actuating a gear tumbler and selective gearing associated therewith.

It is an object of the invention to provide in this gear box means of selecting a drive either through the lead screw for chasing screws or through the feed rod for actuating the carriage in its longitudinal movement.

It is a further object to provide in this gear box means for selecting the thread that is to be chased and the thread range according to a dial and the selective mechanism associated therewith on the front of the lathe.

It is a further object to provide in this gear box common gearing for varying the speed of both the lead screw and the feed rod and of selectively selecting the drive for said lead screw and feed rod from two lines of power mechanism driven from a common power source.

It is a further object to provide means of providing a self-driven power for the feed rod which need not be as accurate in its driving as the lead screw and a separate power source through multiplying gears comprising a direct drive in order to insure extreme accuracy in the actuation of the lead screw for thread chasing.

It is a further object by this selective mechanism for rendering the driving gear through the lead screw inoperative during the period that the feed rod is being actuated in order to eliminate the noise and wear upon the driving gears for the lead screw during the period the feed rod only is being actuated.

It is a further object to provide means of ventilating the base of the tool while at the same time presenting a decorative appearance and preventing the entrance of foreign materials into the base.

It is a further object to provide a novel form of base for a lathe in which all of the operating elements are enclosed, such as the drive motor, the hydraulic controls, and the coolant motor, together with the coolant sump integrally formed as a part of the base casting, together with storage racks mounted on swinging enclosure doors.

It is a further object to provide a base so designed as to provide a recess in the face thereof without narrowing the top of the base so as to permit an operator to sit on a stool in front of the base and have his knees accommodated while he can be positioned within operative reach of the mechanism mounted upon the base.

It is an object to provide sumps on the forward and rear sides of the top of the base for catching surplus lubrication, chips and other foreign material.

It is an object to provide on top of the base an island for the support of the carriage way bed casting.

It is a further object to provide such a carriage way bed casting with hardened ways and particularly with the novel feature of a V-way angle less than 90 degrees.

It is an object to take advantage of a discovery that has been made, that by having an angle on the way less than 90 degrees, there is obviated the tendency of the carriage to lift under certain cutting conditions which exists when the way is 90 degrees or greater.

It is a further object to provide such an angle of way in association with the hardened surfaces because otherwise the thrust which is resisted by this less than 90 degree angle would produce excessive wear.

It is an object to combine a hardened way with an angle of less than 90 degrees in order to accomplish this novel result.

It is a further object to provide anti-friction bearing gibs engaging the underside of the ways of the bed. These gibs have the object of holding the carriage down while permitting free longitudinal movement and also limit any tendency of the carriage to ride up or rock upon the ways, thereby reducing the wear on the ways.

It is also an object to provide a cam lock for positioning the roller bearings constituting the anti-friction gib way mechanism.

It is an object of this invention to provide in the apron on the carriage additional means for reversing the direction of the carriage in addition to the reversing means in the headstock and gear box.

It is a further object to provide in connection with the apron a pump automatically operated to give lubrication to the carriage, the bed and the apron parts.

It is an object to provide in the apron totally enclosed longitudinal movement friction clutches which are cam operated.

It is a further object of the invention to provide a novel form of tool holder which can be locked by a simple up-and-down movement of a handle projecting towards the operator and cam locked into position.

It is a further object to provide a novel means of attaching the cross-slide dust cover.

It is a further object to provide direct reading micro-engaging dials for adjusting the position of the cross-slide for diameter of cut on workpieces. In operation the operator places the work in position and then takes his first cut. Then the dials are set to indicate the diameter of the first cut that has been taken. The result is that the cutting tool and the dials are then set in the same relationship so that thereafter it is unnecessary for him to measure the workpiece in adjusting the tool for additional and different cuts. The position of the dials indicate directly to him the diameter of the cut. The outer dial is in thousandths and the inner dial in inches and fractions of inches.

It is an object to provide a carriage having means for conveying the cutting tools along their true linear, longitudinal path and for supporting the cross-feeding mechanism with a compound rest for angular turning and a taper attachment for turning work that deviates from the true, straight and cylindrical form.

It is a further object to provide in association with the same mechanism a thread chasing stop, the purpose of which is to limit the depth of cut by the cutting tool. From this base stop the adjustments for depth of cut are made on the top slide adjustment.

It is a further object to provide means of rendering operative or inoperative the foregoing stop.

It is a further object to provide cross-feed mechanism for turning work at right angles to its axis, for varying the depth of cut in turning the work parallel to its axis and for operating in conjunction with the taper attachment for turning tapered work.

It is a further object to provide a cross-feeding mechanism, together with a compound rest, to provide manual means for turning steep angles, to provide manual means for form turning and to provide means for impeding cross slide motion parallel to the angular side of threads in thread chasing.

It is a further object of this invention to provide a lathe taper attachment to secure accurate and quick setting for turning and boring tapered work to any desired taper and to accomplish this result without disturbing the means for turning true cylindrical work.

It is a further object to provide a vernier reading attachment for the swivel mounted on the bracket slide.

It is a further object of this invention to provide an adjustable eccentric adjustment for the ball-bearing on the taper slide.

It is a further object to provide a gear box that is totally enclosed and to which all the operative mechanism either runs in oil or is bathed in oil.

It is a further object to provide a single means of control for selection of the different gearing ratios.

It is a further object to provide means of rendering inoperative a portion of the mechanism while the other part is operating normally and for rendering inoperative the pick-off gears as part of the drive during the period of the driving only of the feed rod. The purpose in the foregoing is to eliminate the wear and noise due to the operation of the mass of pick-off gears on the end of the lathe. It also permits of a slower speed drive of the feed rod without the necessity of running the rest of the mechanism at high speeds, as high as 2500 R. P. M. or above.

It is a further object to provide this gear box recessed within the bed where it is out of the way and is protected, but at the same time accessible.

It is a further object to provide a novel tailstock clamp embodying a lever system in order to multiply the clamping effect.

It is a further object to provide wipers between the tailstock and the bed to prevent the foreign material from getting beneath the tailstock, which would result in the wear of the tailstock base itself.

It is a further object to provide a novel system of lubrication feeding by a series of reservoirs in the tailstock base which is so frequently adjusted and subject to excess wear.

It is a further object to provide a tailstock which functions as an adjustable work support in conjunction with means for drilling work concentric with the rotation of the lathe spindle and also as a means for turning tapered work between center.

Referring to the drawings:

Figure 3 is a rear elevation with the cover plate providing access to the coolant pump, partially broken away.

Figure 4 is an end elevation of the left-hand end of the lathe, as viewed in Figure 1, showing the arrangement of the decorative cover strips which are utilized for providing controls of the louver openings in the bed casing, while at the same time preventing undue access of foreign materials into the lathe casing.

Figure 4a is a section of the line 4a—4a of Figure 4, looking in the direction of the arrows, and illustrating the method of guarding the ventilation openings in the bed casing by the use of guard strips, as indicated in the drawings Figure 4 and Figure 4a.

Figure 5 is an end elevation of the lathe with the base of the lathe in section and with the bed of the lathe also in section. This view is taken on the section line 5—5 of Figure 1, looking in the direction of the arrows.

Figure 6 is a detailed front elevation of the headstock casing of the lathe and the controls for the headstock spindle, the electric motor drive, the hydraulic change gearing speed gear mechanism, and the controls for the gear box.

Figure 10 is a section taken longitudinally and vertically through the headstock casing showing a portion of the headstock spindle in elevation and a portion broken away and in section. This section is taken on the line 10—10, looking in the direction of the arrows, of Figure 11.

Figure 15:
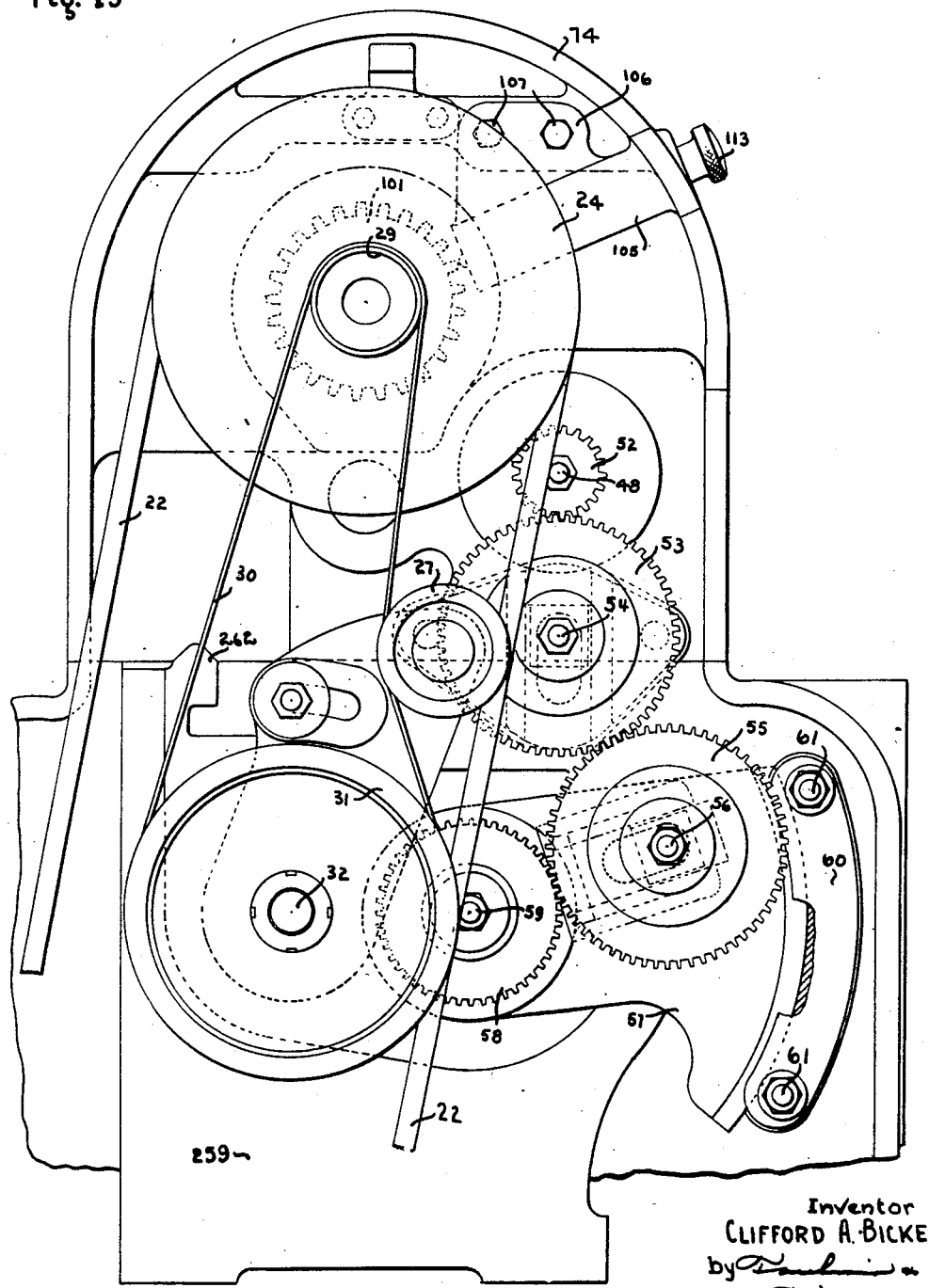

Figure 15 is an end elevation of the upper portion of the left-hand end of the lathe showing the pick-off gear mechanism which constitutes the direct drive from the power source to the lead screw. This view also illustrates the drive through a belt and associated mechanism for the feed rod. The cover has been removed in order to permit the illustration of these parts.

Figure 16:
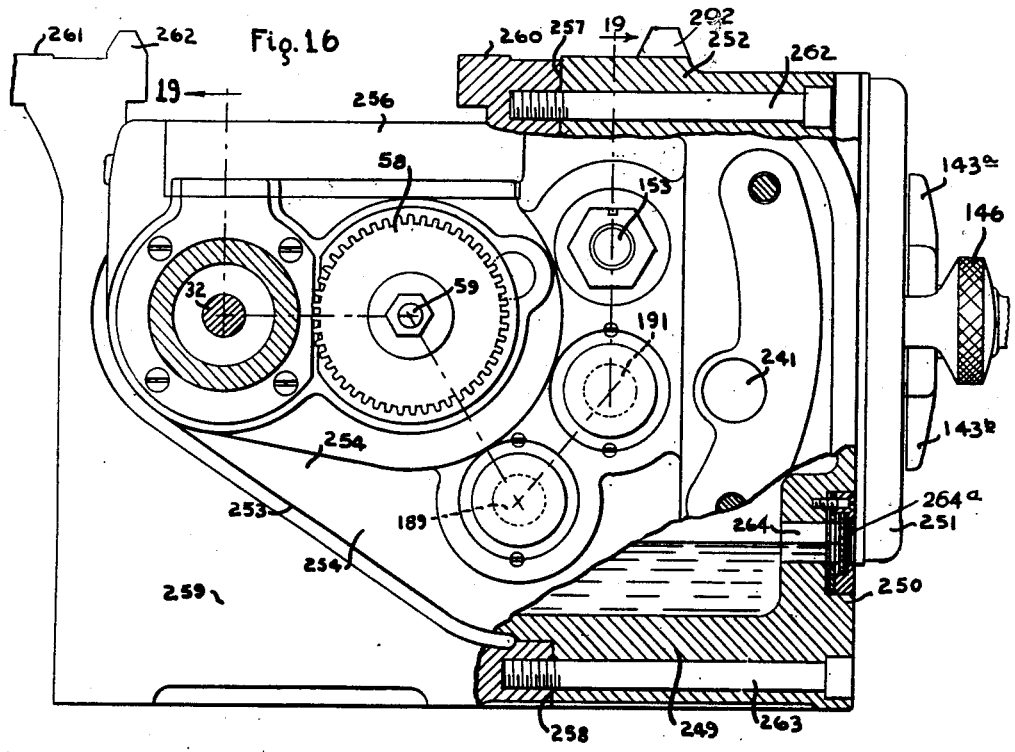

Figure 16 is an end elevation, partially in section, of the gear box casing showing its relationship and positioning within the bed of the lathe.

Figure 17:
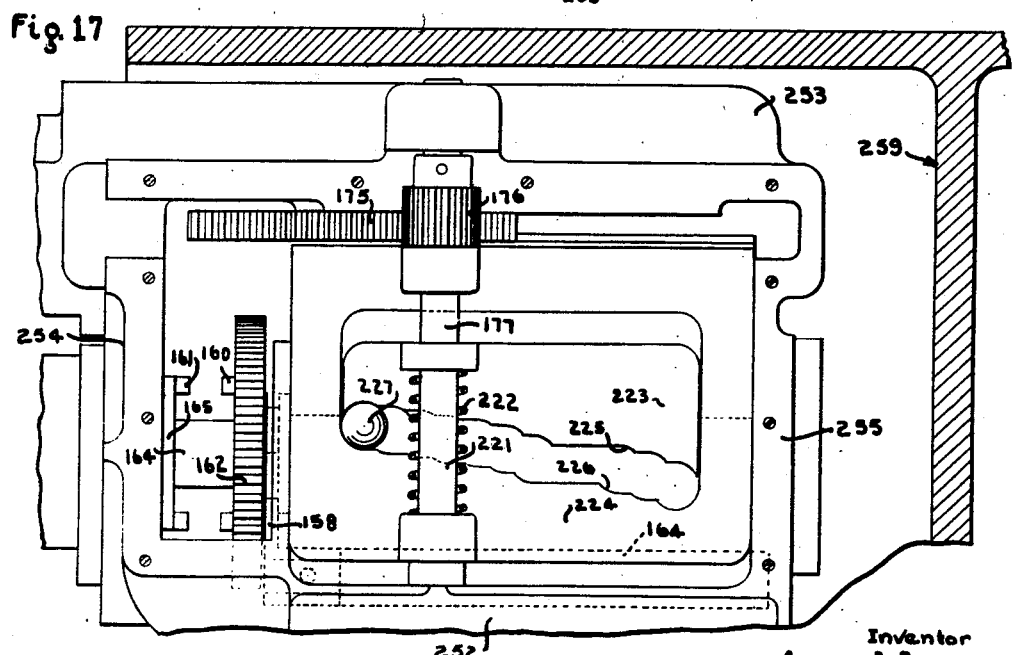

Figure 17 is a top plan view of part of the gear box mechanism with the lathe base partially in section.

Figure 1:
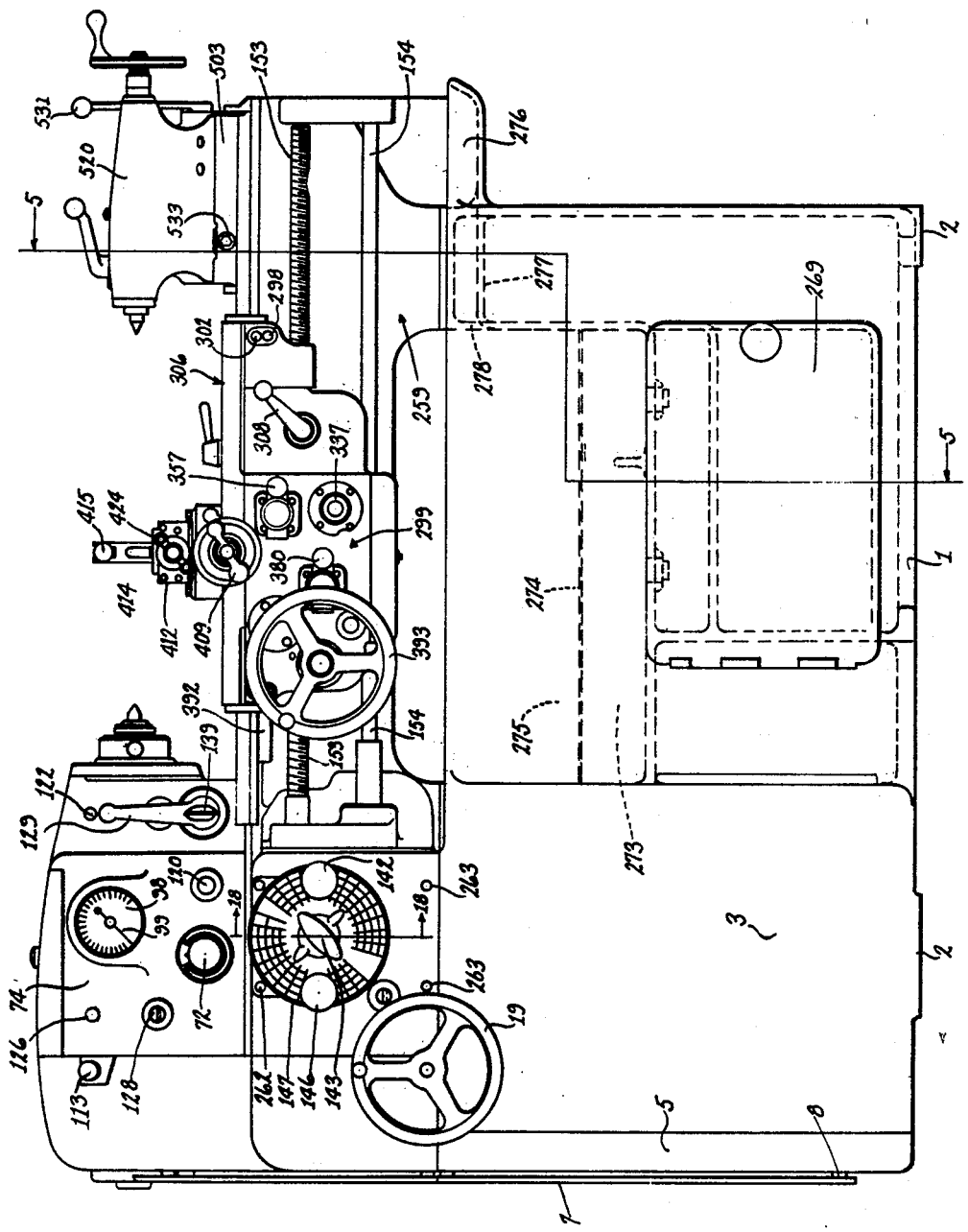
Figure 1 is a front elevation of the lathe.
Figure 2:
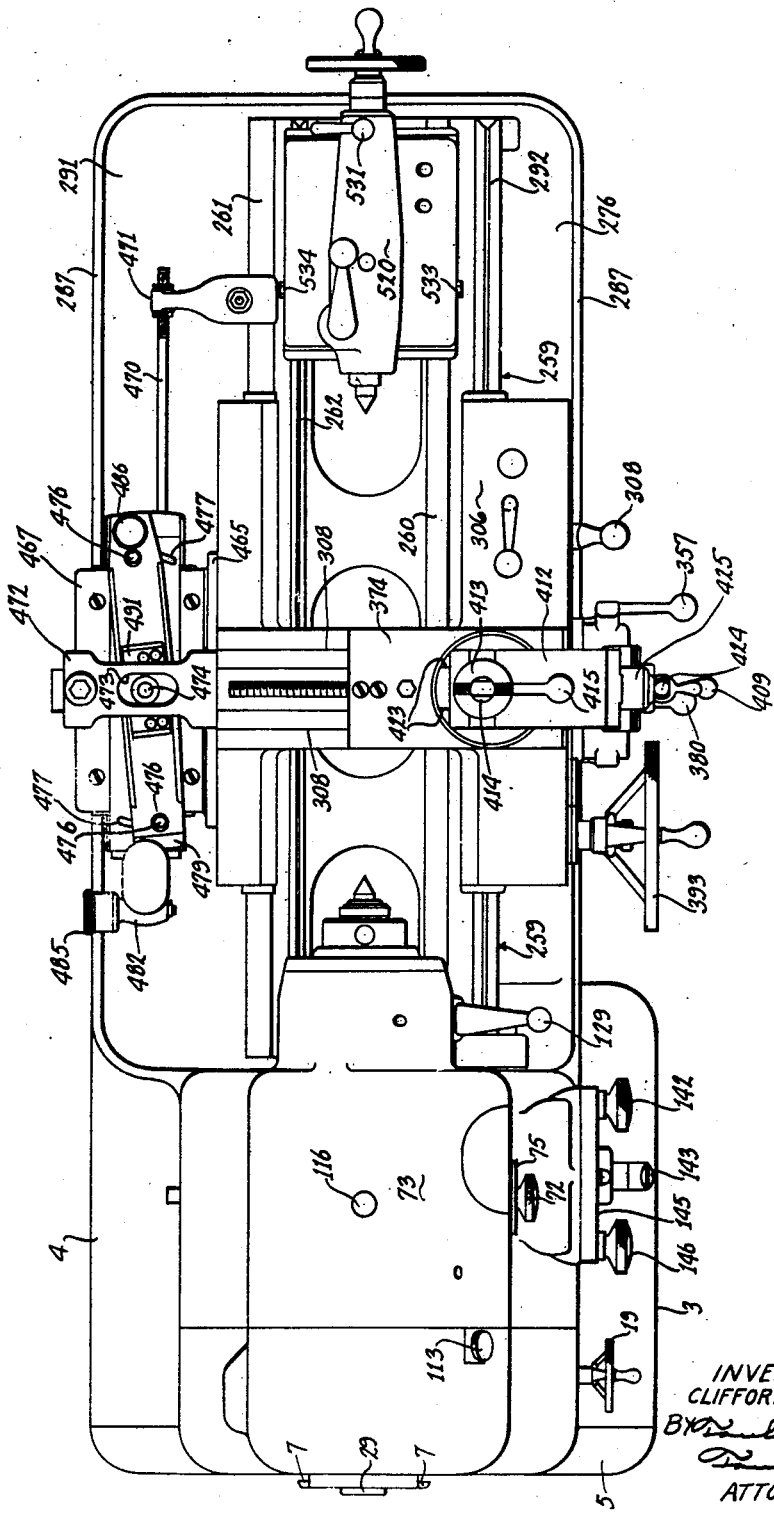
Figure 2 is a top plan view of the lathe.
Figure 18:
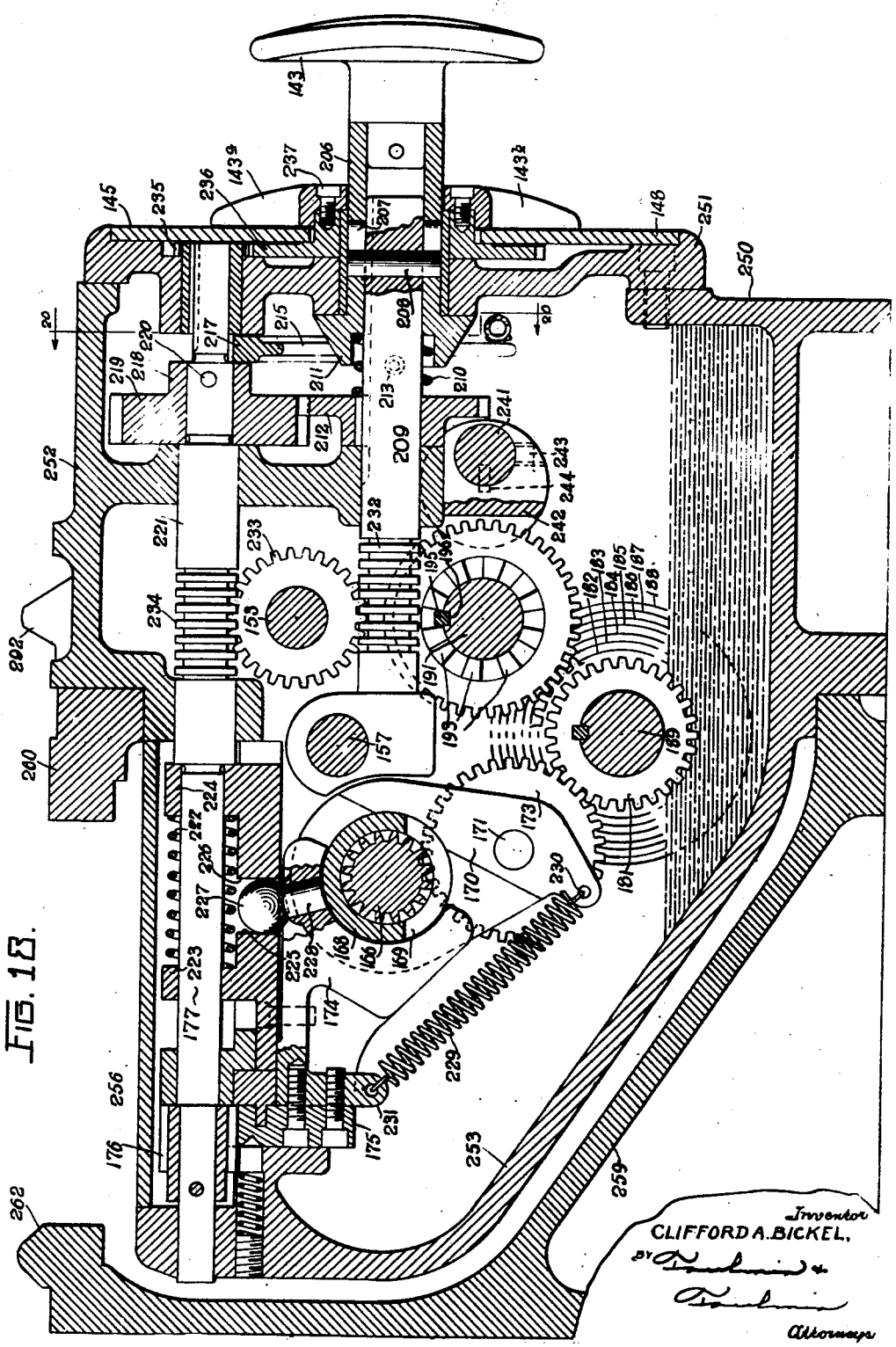

Figure 18 is a section on the line 18—18 of Figure 1. It shows in detail transversely of the gear box the association of the several parts within the gear box.

Figure 19:
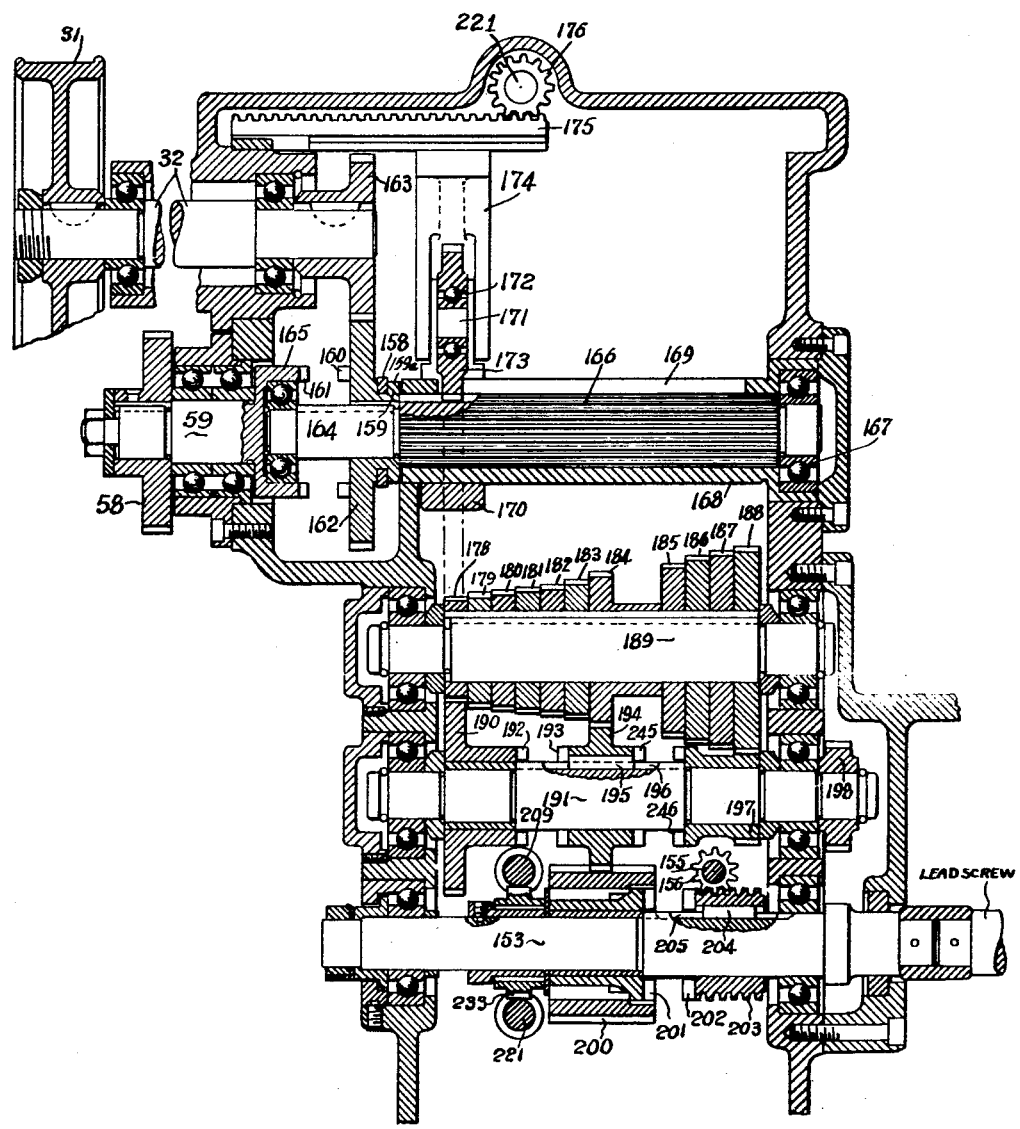

Figure 19 is a section through the gear box on the line 19—19 of Figure 16, looking in the direction of the arrows.

Figure 20:
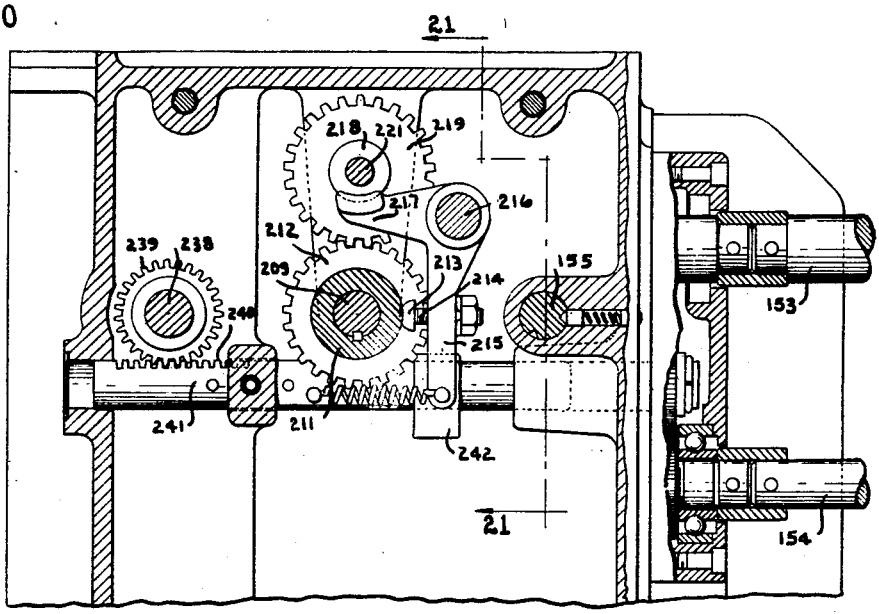

Figure 20 is a section on the line 20—20 of Figure 18, looking in the direction of the arrows.

Figure 21:
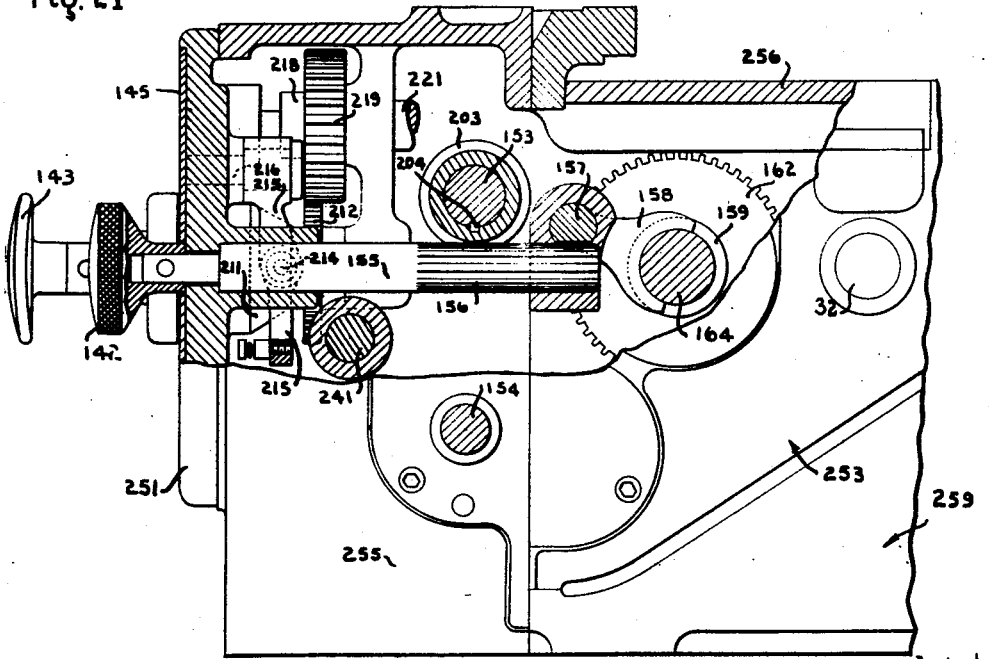

Figure 21 is a section through the gear box with the gear box casing partially broken away, this section being taken on the line 21—21, looking in the direction of the arrows, of Figure 20.

Figure 22:
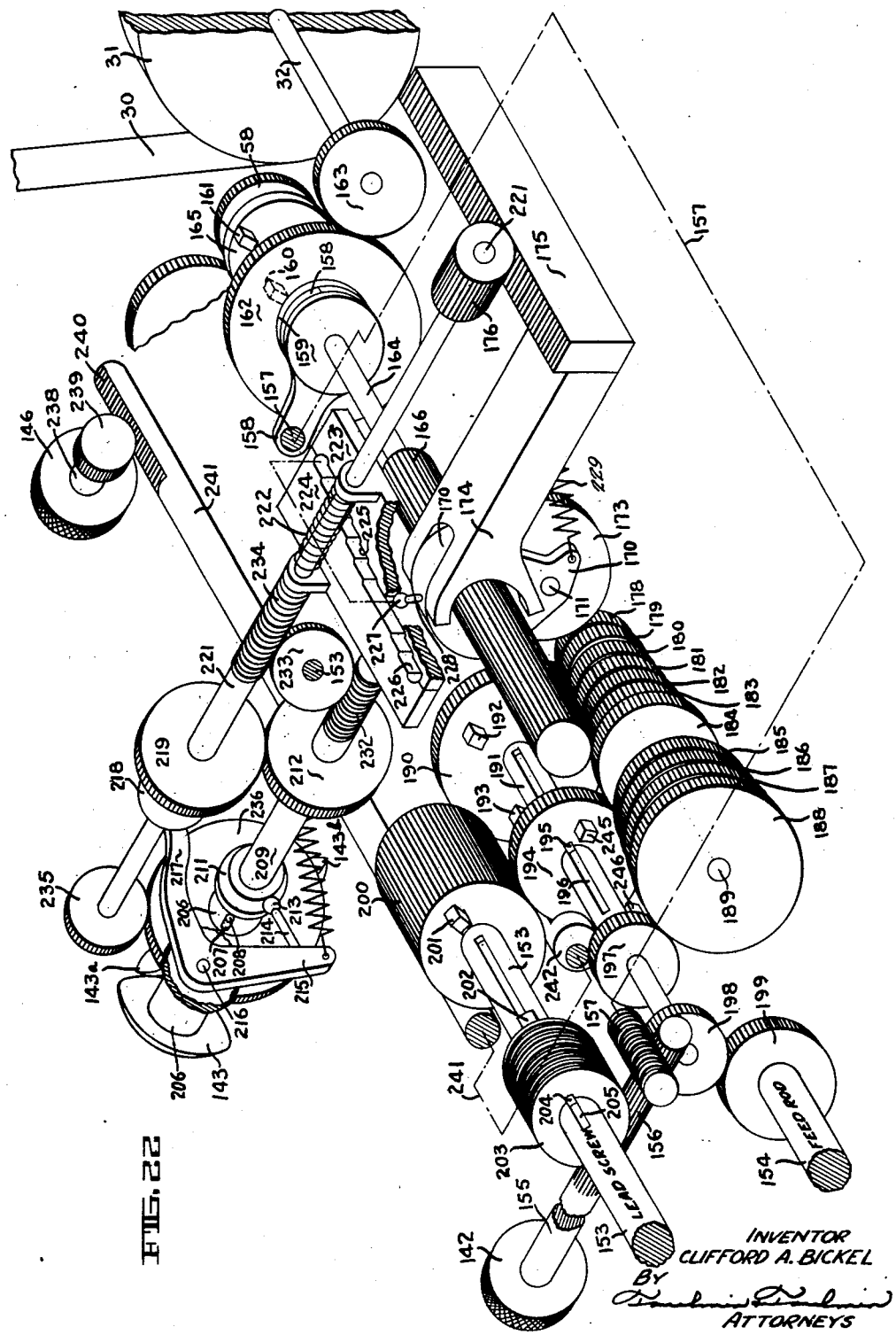

Figure 22 is a diagrammatic perspective showing the arrangement diagrammatically of the gearing and controls in the gear box.

Figure 23:
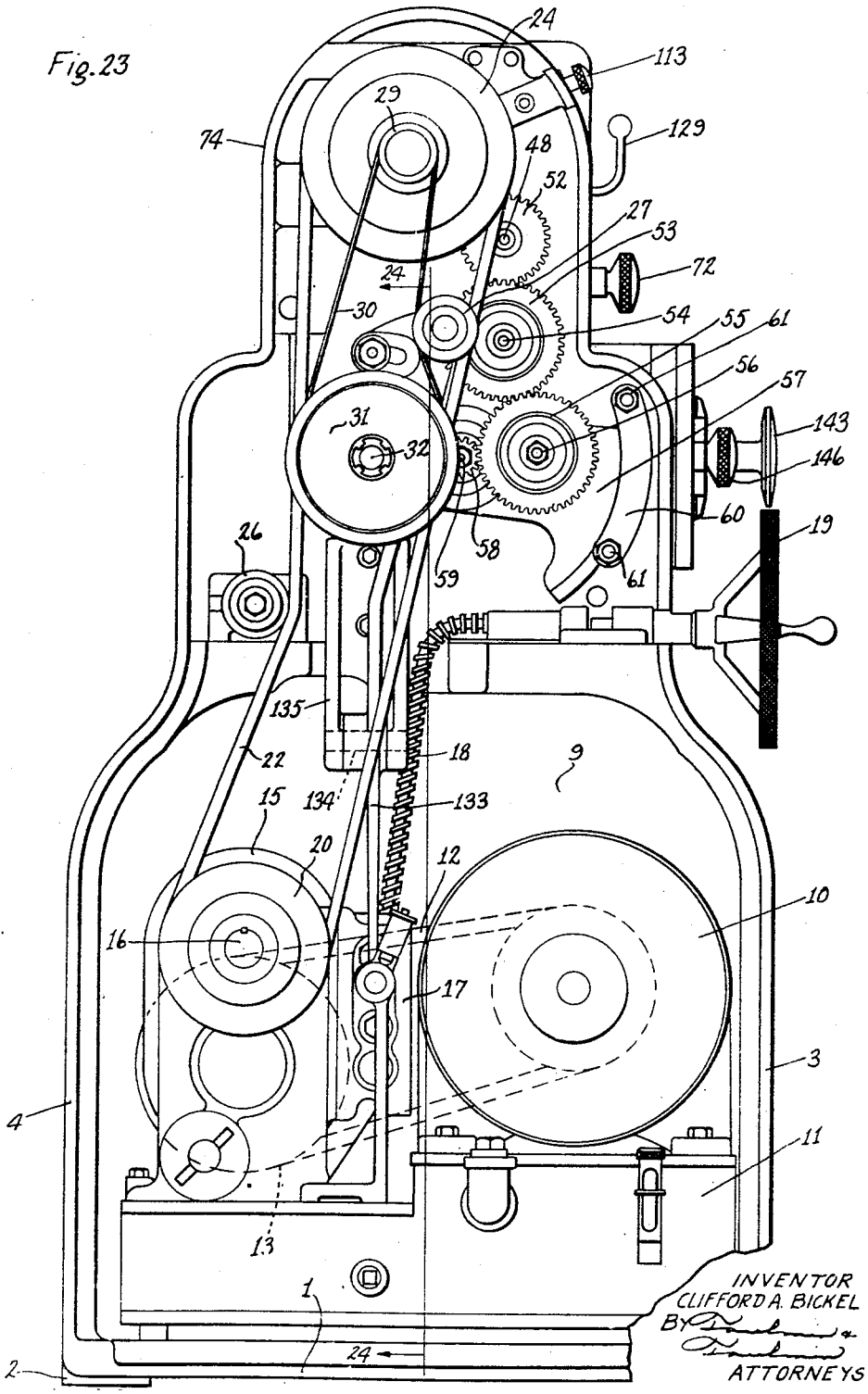

Figure 23 is an end elevation of the left-hand end of the lathe, as viewed from the front of the lathe, with the end cover removed showing the complete arrangement of the electric motor drive, the hydraulic change speed mechanism and the belt and gear drive to the feed rod and lead screw.

Figure 24 is a detail view, partially in section, showing the arrangement of the hydraulic power transmission, the arrangement of the controls therefor, and the arrangement of the connection of the driving belt with respect to this hydro-power transmission.

Figure 25 is a front elevation in detail of the carriage, and particularly the apron of the carriage, together with the controls. The apron is shown partially in section in order to illustrate the mechanism for actuating the lubrication pump and for illustrating the pump itself.

Figure 26 is a section through the apron on the line 26—26, looking in the direction of the arrows, of Figure 25.

Figure 27 is a section on the line 27—27 through the apron, as will be seen in Figure 25, looking in the direction of the arrows.

Figure 28 is a diagrammatic view in the form of an isometric perspective showing the arrangement of the gearing and clutches in association with the apron and the carriage.

Figure 29 is a section taken vertically through the apron on the line 29—29, looking in the direction of the arrows, of Figure 25.

Figure 30 is a section taken vertically on the line 30—30 of Figure 25 showing the arrangement of the reversing mechanism.

Figure 31 is a vertical section through the apron, carriage and lathe bed showing the adjusting mechanism for adjusting the antifriction gib way mechanism. This section is taken on the line 31—31, looking in the direction of the arrows, of Figure 25.

Figure 32 is a section through the shifting gears for reversing the direction of the carriage. This section is taken on the line 32—32, looking in the direction of the arrows, of Figure 30.

Figure 33:
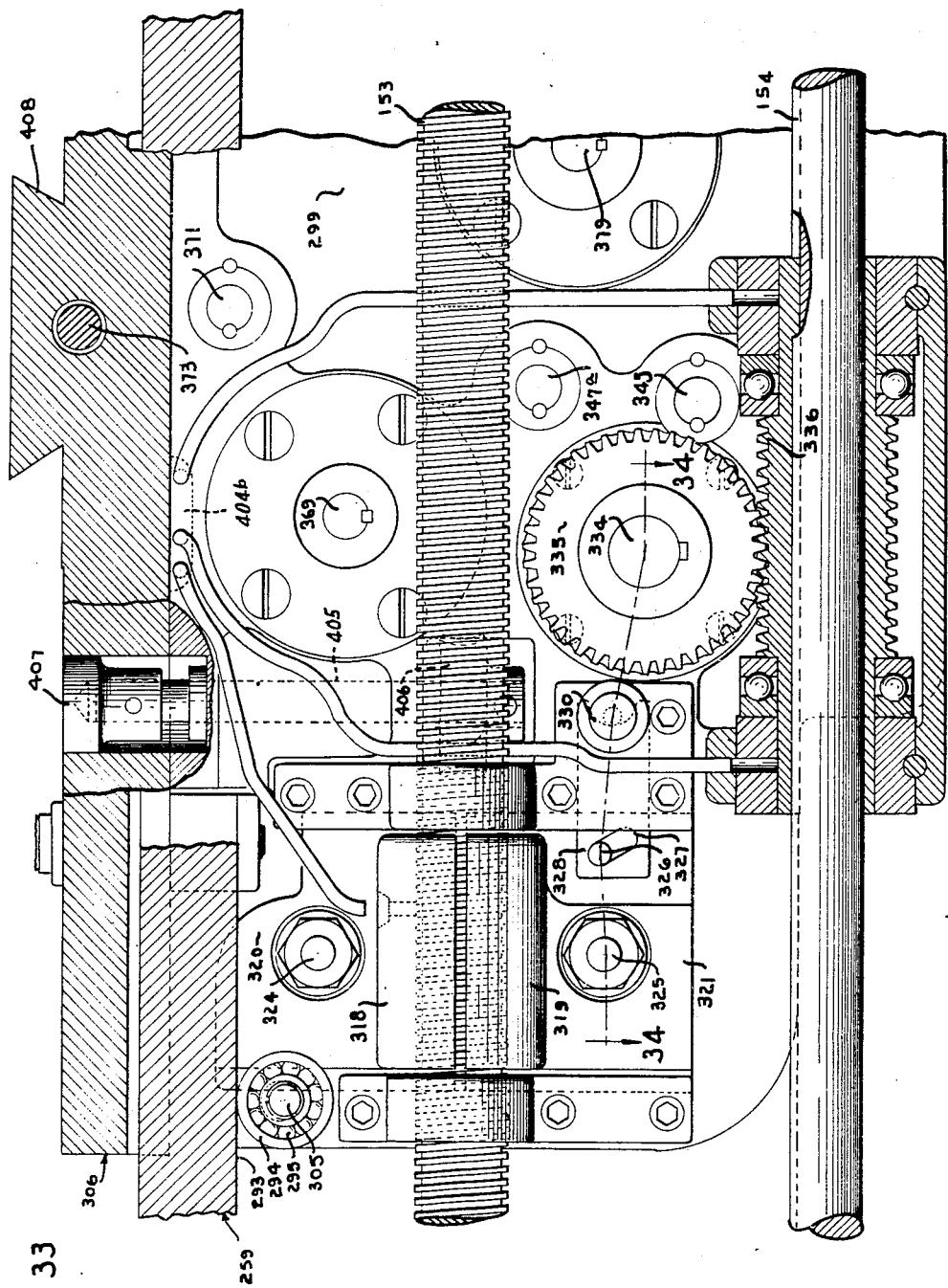

Figure 33 is a rear elevation of the lead screw, the half nut clamping mechanism and associated parts, including a portion of the drive from the feed rod, together with portions of the carriage in section.

Figure 34 is a section through the apron taken horizontally on the line 34—34, looking in the direction of the arrows, of Figure 33 showing the interlock device between the apron reversing gears driven by the feed rod and one of the lead screw clamping nuts.

Figure 38:
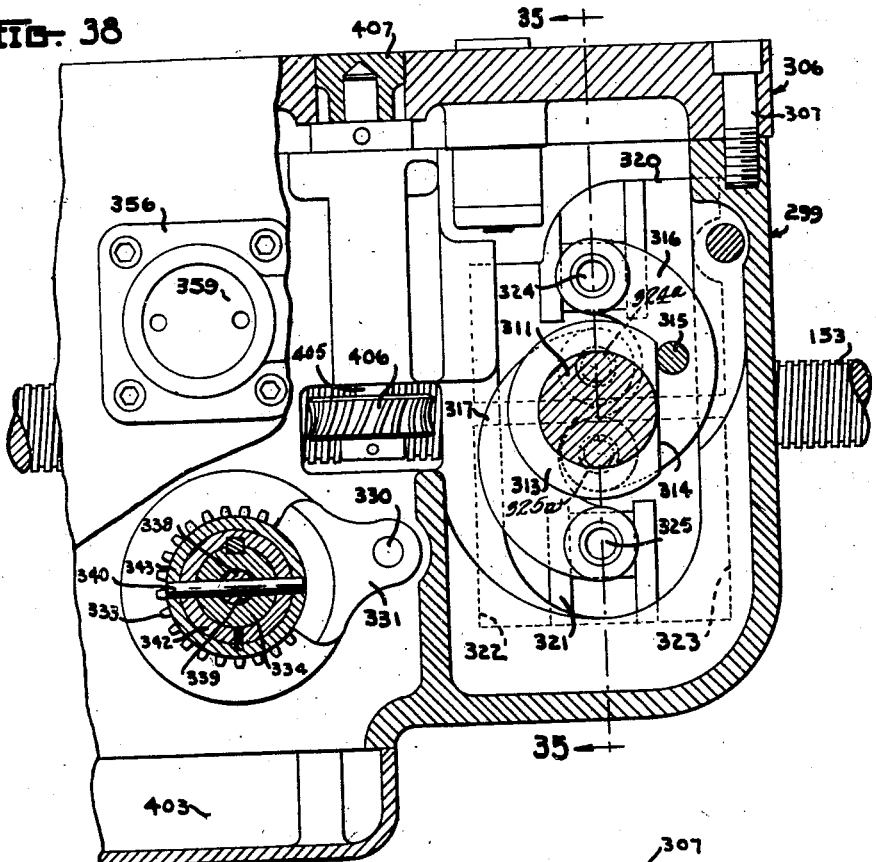

Figure 35 is a section on the line 35—35, looking in the direction of the arrows, of Figure 38.

Figure 36 is a section on the line 36—36 of Figure 25, looking in the direction of the arrows, showing a portion of the lead screw, the clamping nut, and the actuating mechanism therefor.

Figure 37 is a similar view to Figure 34 showing the parts in a different relative position.

Figure 38 is a section on the line 38—38 of Figure 36, looking in the direction of the arrows and extending somewhat further toward the left to show the interlock shifter and the thread chasing dial mechanism.

Figure 39:
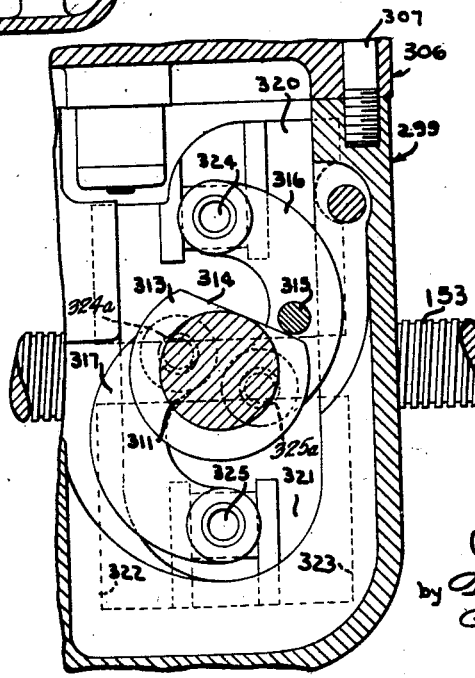

Figure 39 is a similar section taken on the same line showing the parts in a different position.

Figure 40 is a vertical section taken longitudinally through the tailstock showing the tailstock quill and associated mechanism in elevation. This view particularly illustrates the clamping mechanism for clamping the tailstock to the lathe bed. Figure 40 is a section on the line 40—40, looking in the direction of the arrows, of Figure 42.

Figure 41 is a detailed view showing the graduations on the tailstock quill, and the means for locking tanged tool bits.

Figure 42 is a transverse section on the line 42—42 of Figure 40. A portion of the tailstock is shown in elevation.

Figure 43 is a detailed view partially in section showing the locking mechanism for the tailstock quill.

Figure 44 is a section on the line 44—44, looking in the direction of the arrows, of Figure 40. This illustrates a portion of the clamping mechanism for clamping the tailstock to the lathe bed.

Figure 45 is a section on the line 45—45, looking in the direction of the arrows, of Figure 46. It illustrates the lubrication mechanism for lubricating the ways and the base of the tailstock.

Figure 46 is a section on the line 46—46, looking in the direction of the arrows, of Figure 45.

Figure 47:
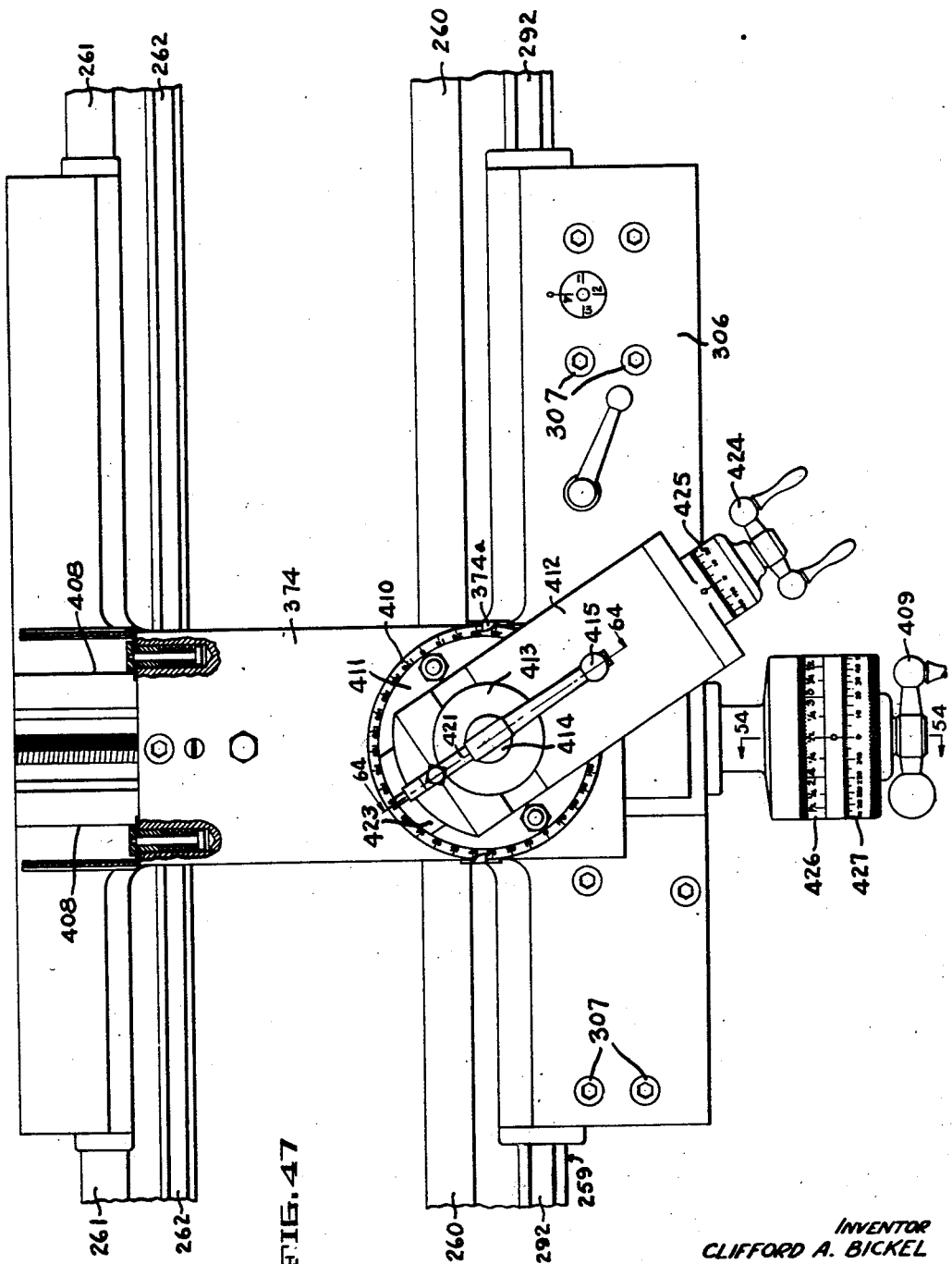

Figure 47 is a detailed plan view of the carriage and cross-slide which also illustrates the micrometer adjusting and measuring mechanism, together with the top slide adjustment.

Figure 48 is a top plan view, partially in section, showing in detail the taper slide mechanism, and in particular, the arrangement of the vernier adjustment for the taper slide.

Figure 49 is a detailed plan view of the vernier taper slide adjustment scale.

Figure 50 is a section on the line 50—50, looking in the direction of the arrows, of Figure 49.

Figure 51 is a section on the line 51—51, looking in the direction of the arrows, of Figure 48, showing the arrangement of the actuating mechanism for the vernier adjustment of the taper slide.

Figure 52 is a detailed section, taken vertically, showing the adjusting mechanism for the eccentric lock for the ball bearing on the taper slide. This section is taken on the line 52—52, looking in the direction of the arrows, of Figure 48.

Figure 53 is a vertical section through another type of ball-bearing adjustment of the taper-slide. This section is taken on the line 53—53, looking in the direction of the arrows, of Figure 48.

Figure 54:
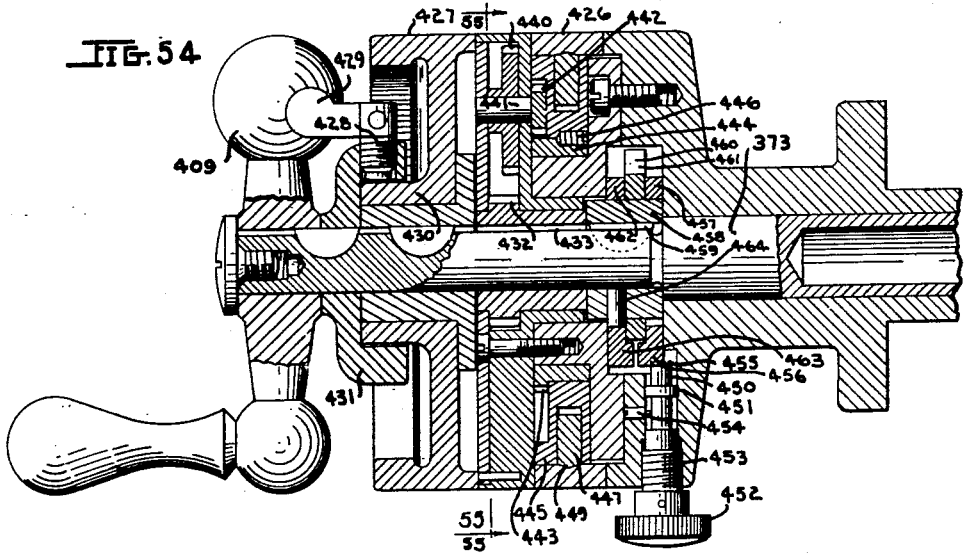

Figure 54 is a section on the line 54—54, looking in the direction of the arrows, of Figure 47. This illustrates in section the method of driving and adjusting the indicating dials on the cross-feed.

Figure 55:
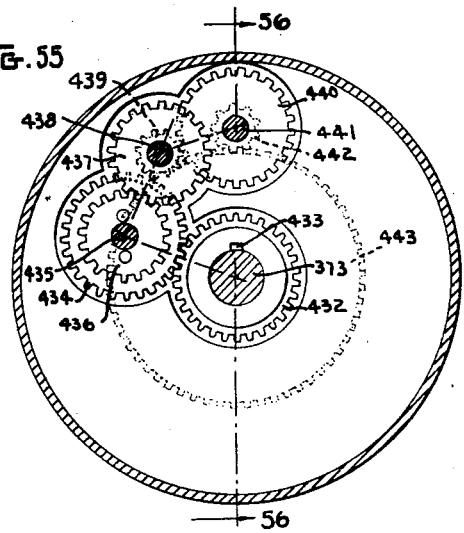

Figure 55 is a section on the line 55—55, looking in the direction of the arrows, of Figure 54.

Figure 56:
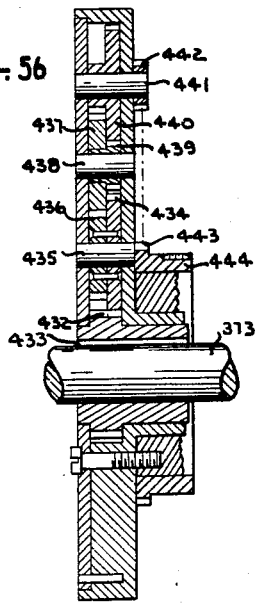

Figure 56 is a section on the line 56—56, looking in the direction of the arrows, on Figure 55.

Figure 57 is an expanded isometric perspective of the actuating mechanism for the measuring dials which are more fully illustrated in Figure 47 and Figures 54 to 56.

Figure 58 is a developed plan view of the two adjusting dials of Figures 54, 55 and 56.

Figure 59 is a perspective, partially in section and partially broken away, showing the arrangement of thread chasing step.

Figure 60 is a top plan view of the lathe bed showing in dotted lines the location of the gear box with respect to the bed and the location of the electrical control apparatus compartment.

Figure 61 is a section on the line 61—61, looking in the direction of the arrows, of Figure 60.

Figure 62 is a section on the line 62—62, looking in the direction of the arrows, of Figure 60.

Figure 63 is a detailed enlarged section on the line 63—63, looking in the direction of the arrows, on Figure 60, illustrating the case hardening by flame hardening of the lathe bed and illustrating the particular angle of one of the ways which is less than 90 degrees.

Figure 64:
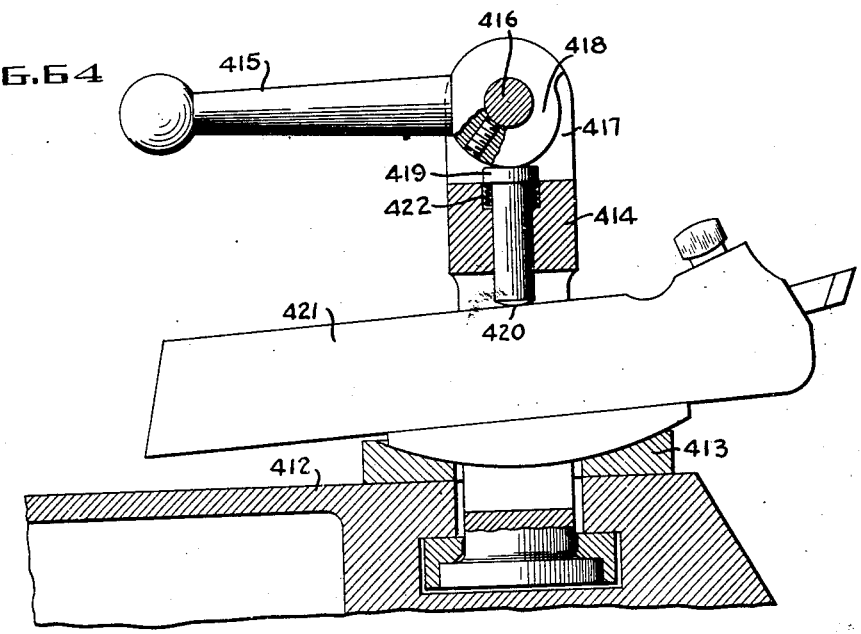

Figure 64 is a vertical section through the tool post clamping mechanism, taken on the line 64—64 of Figure 45.

Figure 65:
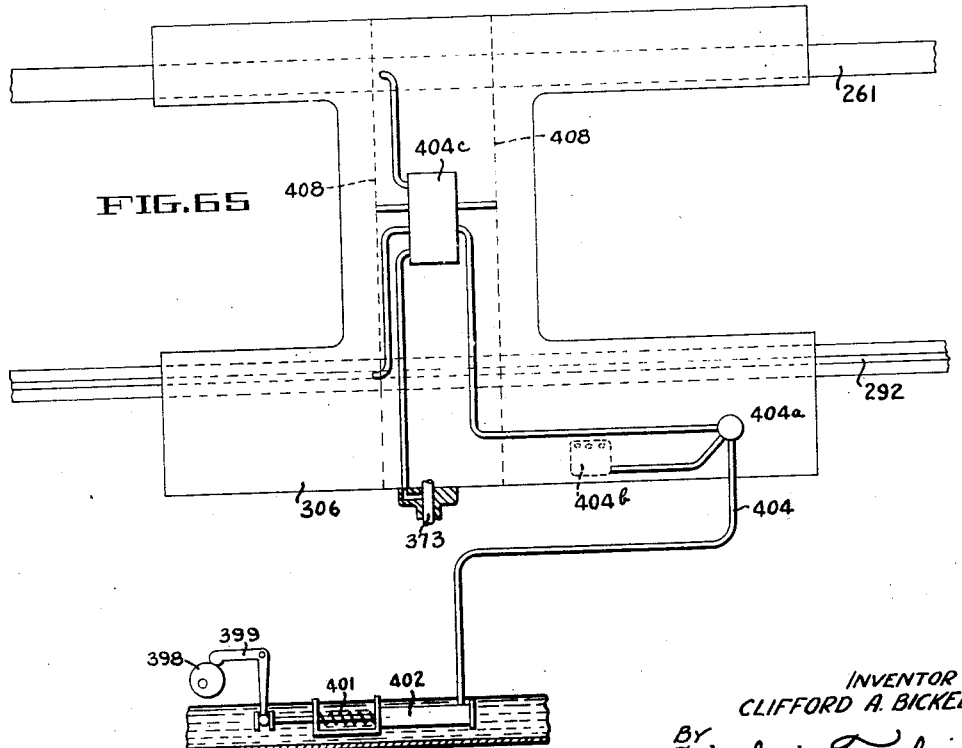

Figure 65 is a diagrammatic view showing the system for supplying pressure lubricant to the several frictional bearing points of the carriage.

*Base construction: Main power drive*

Referring to the drawings in detail, 1 represents and indicates the bottom of the base of the lathe. 2 indicates the feet, of which there are two, beneath the left-hand end of the base and one beneath the right hand end. 3 represents the front wall and 4 the rear wall of the left-hand end of the base which is enlarged to accommodate the driving motor, the hydraulic transmission and various pieces of apparatus associated with the hydraulic transmission and hydraulic controls. An end cover 5 provided with a series of vertical ventilation slots 6 encloses the left-hand end of the base. These slots 6 are protected by spaced vertical exterior strips mounted upon spacers 8. Thus ventilation is permitted without danger of foreign materials being inserted within the base.

Within the compartment 9 formed in the left-hand end of the base there is mounted the electric motor 10, which rests upon the oil reservoir 11 mounted on the inside of the compartment. This motor, in turn, drives through the belt 12 a pulley 13 mounted upon the driving shaft 14 of the hydraulic power transmission unit 15, the adjustment of which brings about a variation in speed of the driven shaft 16 from substantially zero to a speed of 2500 revolutions per minute or greater. This unit is controlled through the control mechanism in the box 17, which, in turn, is actuated by the flexible shaft 18 connected to the hand wheel 19 on the front of the lathe.

The rotation of the hand wheel 19 therefore varies the speed of the driven shaft 16 upon which are mounted a pair of pulleys 20 and 21. Mounted upon these pulleys are the belts 22 and 23, which, in turn, serve to drive the double grooved pulley 24. The belts are maintained suitably taut by the belt tightener pulleys 26 and 27. The pulley 24 is mounted upon the hollow left-hand end of the headstock spindle 28. The extreme left-hand end of this spindle is utilized as a pulley as at 29 for driving the belt 30, which, in turn, drives the pulley 31 on the shaft 32, which ultimately drives the feed rod of the lathe. The pulley 27 acts as a belt tightener for the belt 30.

The motor 10 through the hydraulic variable speed transmission and belts and pulleys heretofore described also drives the lead screw through a series of pick-off gears mounted on the end of the lathe.

*Headstock mechanism*

The headstock spindle 28 is provided with a series of splines 33 for guiding a clutch member 34 which rotates with the spindle 28 and reciprocates thereon. The clutch member 34 is provided with a collar 35 grooved at 36 to receive a shifter mechanism 37. It is also provided with clutch teeth 38 and 39. The teeth 39 are adapted to engage with corresponding teeth 40 on a gear 41 which is rotatably mounted through a bearing sleeve 42 mounted in the headstock. This gear in turn meshes with a pinion 43 mounted on the ball bearings 44 which are in turn mounted upon the sleeve 45 that is mounted in the headstock frame 46.

The gear 43 meshes with a gear 47 on the shaft 48. This shaft is mounted at opposite ends upon ball bearings 49 and 50 respectively mounted in the headstock frame members 46 and 51. This shaft 48 projects outwardly through the frame 46 and carries on its outer end a pinion 52, which in turn drives the gear 53 mounted on the shaft 54. This gear meshes with the gear 55 that is mounted on the axle 56 carried by the swinging, adjustable arm 57. The gear 55 engages with the pinion 58 mounted upon the end of the shaft 59. The arm 57 is adjusted in position as desired and held in position by the clamp 60 and bolts 61. The gear box mechanism driven by this train of gears will be described hereinafter.

Returning to the gearing associated with the headstock spindle, it will be observed that the clutch teeth 38 of the clutch 34 are adapted to engage with the teeth 62 on the side of the gear 63 which is mounted upon a sleeve 64 that in turn is rotatably mounted within the interior of the headstock sleeve 65. A suitable bearing sleeve 65 supports and engages the exterior of the sleeve 64, such bearing sleeve 65 being mounted in the frame 51. This gear 63 meshes with the gear 66 mounted on the shaft 48.

The clutch 34 is shifted by the fingers 37 which are mounted by a sleeve 67 upon a rack 68 having teeth 69 engaging with a pinion 70. This pinion 70 is mounted upon the actuating control rod 71 or is a part thereof. The end of the rod 71 is provided with a knurled head 72 so that the rod can be rotated. The rod 71 is supported in a bearing 73 in the front of the housing 74 which houses the headstock mechanism. The other end of the shaft 71 is supported in the bracket 71a.

Associated with the exterior of the housing is a dial 75, over which the pointer 76 travels. The pointer 76 is mounted to turn with the head 72. This dial 75 is arranged to indicate the feed position 77 for the feed rod during which the clutch 35 is in neutral; the forward position 78, and reverse position 79 for the lead screw area 80 to provide for right and left-hand screws respectively. The operation of this apparatus will be hereinafter described. The shifting of the clutch fork or shifter rod 37 is effected by the rotation of the shaft 71. The rack 68 is supported on extensions 81 and 82 which slide in bearings at either end. The extension 82 slides within the bearing sleeve 83 in the frame 51. The extension 81 slides within the sleeve 45 in the frame 46.

The spindle itself is mounted within and supported by ball bearings 84, 85 and 86 which are arranged on either side of the clutch 34 and the gearing rotatably mounted upon the spindle. A spacer 85A is located between said ball bearings 85 and 86.

It will be noted that the gears 41 and 63 are mounted on bearing sleeves which are in turn mounted within the frame members 46 and 51. Thus there is a secure bearing support closely adjacent to the clutch 34 for the gearing driven by the spindle 28 through the clutch 34.

The spindle 28 also carries a gear 87 which is fastened to it and turns with it. This gear meshes with a pinion 88 mounted on ball bearings 89 which are in turn supported by the sleeve 83. This gear is primarily for the purpose of splashing sufficient oil to lubricate the tachometer assembly hereinafter described.

This assembly consists of the following. The gear 87 fastened to the spindle 28 meshes with the gear 91 mounted on the shaft 92. The shaft 92 carries a beveled pinion 93 which engages with a beveled pinion 94 on the tachometer shaft 95 supported in the bracket 96. This in turn drives the tachometer 97 which is provided with a dial 98 and indicating needle 99 which moves over the scale 100.

Figure 9:
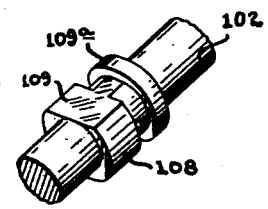
Figure 9 is a perspective of a portion of the spindle lock bolt.
Figure 8:
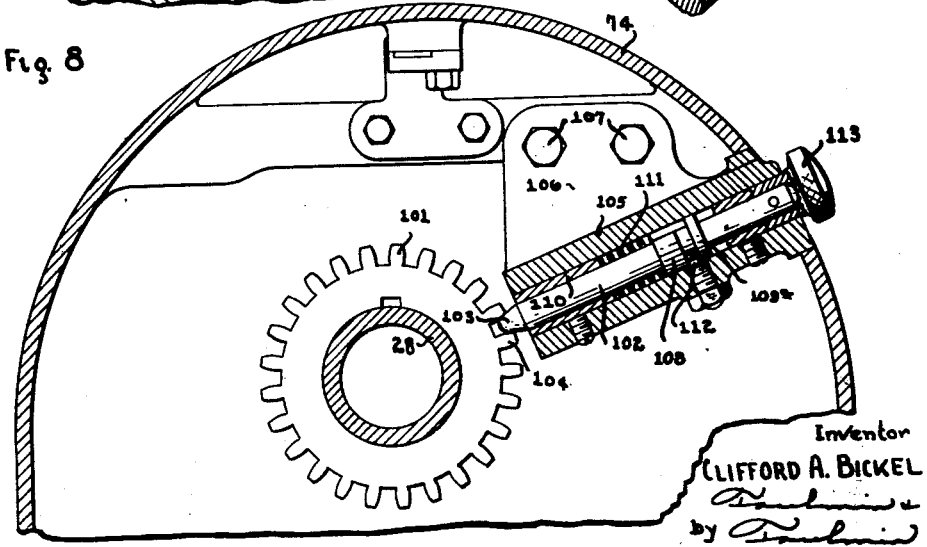
Figure 8 is a section on the line 8—8 of Figure 10 illustrating the headstock spindle lock.
Figures 11, 12:
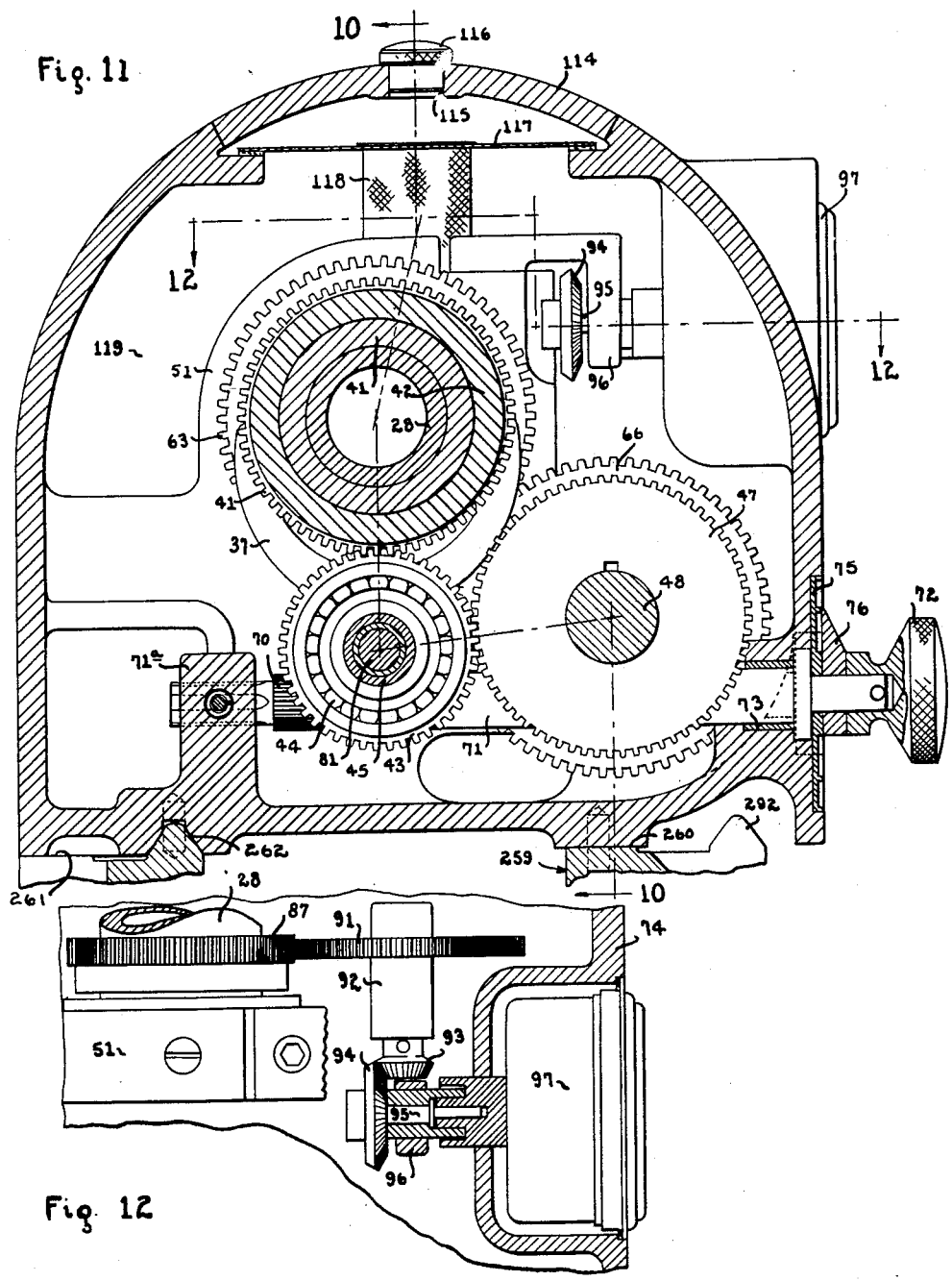
Figure 11 is a section on the line 11—11, looking in the direction of the arrows, of Figure 10.
Figure 12 is a section on the line 12—12 of Figure 11, looking in the direction of the arrows. It illustrates the arrangement of the drive for the tachometer.
Figure 13:
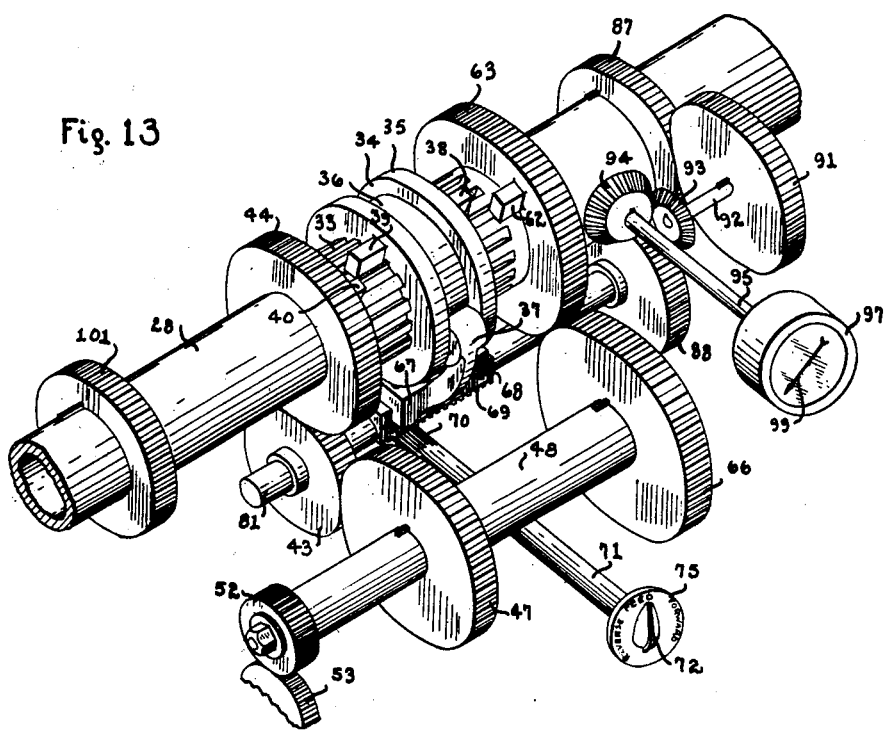
Figure 13 is a diagrammatic perspective of the gearing of the headstock spindle and associated mechanism, including the gearing for driving the tachometer.

The spindle 28 is also provided with means for adjustably holding it stationary to facilitate the mounting and positioning of work between the headstock spindle and tailstock spindle. This mechanism is shown particularly in Figures 8, 9 and 10. It consists of a gear 101 keyed to the headstock spindle 28 and engaged by a removable plunger 102, the nose of which 103 is adapted to be inserted between the teeth 104 of the gear to prevent the gear from rotating and consequently to prevent the spindle 28 from rotating. This locking plunger shaft 102 is mounted within a sleeve 105 of the bracket 106 which is bolted by the bolts 107 to the housing 74. On the plunger 102 is a shoulder member 108 which is cut away at 109.

Between this shoulder and a sleeve 110 within the sleeve 105 is a helical spring 111 adapted to normally disengage the locking pin 102. It is prevented from being disengaged by the pin 112 which is inserted between the annular shoulder member 108 and a second annular member 109a. However, by rotating the shaft 102 until the cutaway portion 109 is opposite the pin 112, the spring 111 can push the locking pin 102 out of engagement with the teeth 104. The spindle locking pin 102 has a knurled actuating head 113.

The spindle 28 is provided with the usual mechanism for attaching work pieces which form no part of the present invention and need not be described here.

The lubrication system of the headstock mechanism is arranged as follows. A detachable cover plate 114 is provided with a filler opening 115 and a filler plug for closing the opening, such a plug being designated 116. Lubricating oil is introduced through the opening 115, whence it is directed by the pan 117 to the strainer 118 through which it passes into the chamber 119 containing the gearing heretofore described, the clutch and clutch shifter mechanism. The level of the oil in this lubrication system is indicated through a sight glass window 120 on the front of the casing 74.

Figure 7:
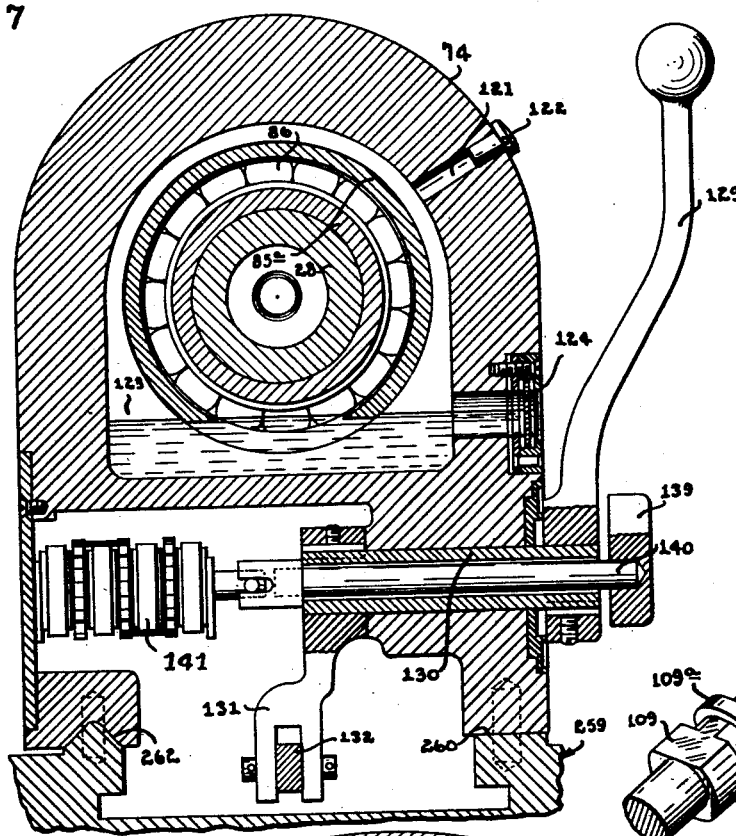
Figure 7 is a section on the line 7—7 of Figure 6 looking in the direction of the arrows, illustrating one of the control mechanisms for the hydro change speed mechanism, the control mechanism for the electric motor drive, and illustrating the right-hand bearing support for the headstock spindle.

Turning to Figures 6, 7 and 10, there will be seen a passageway 121 closed by a removable plug 122 in the wall of the casing 74. This opening is for the purpose of introducing lubricant into the chamber 123 which communicates with the bearings 85 and 86 separated by the spacer 85a. The level of the oil in this chamber can be seen through the sight glass 124 in the front of the casing.

Figure 14:
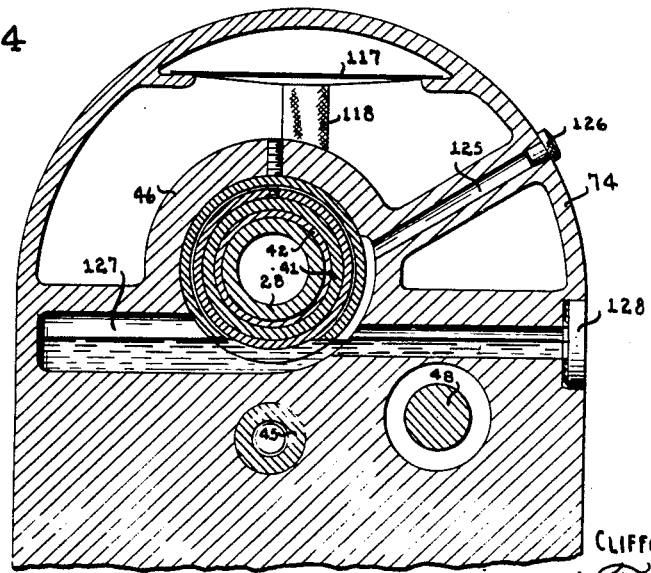
Figure 14 is a section on the line 14—14, looking in the direction of the arrows, on Figure 6. It illustrates the mechanism for lubrication of the left-hand rear end of the headstock spindle.

Referring to Figures 6 and 14, there will be found another passageway 125 controlled by a removable plug 126 mounted in the casing 74 through which lubricant is supplied to the chamber 127 so that adequate lubrication is provided for the ball bearings 84 and associated bearings. The lubrication level is seen through the sight glass 128 on the face of the casing 74.

With reference to Figures 6 and 7, the lever 129 controls the neutral, forward and reverse positions of the hydraulic transmission 15 through a control box 17 (see Figure 24); and this is accomplished by the lever 129 actuating a sleeve 130 journaled in the casing 74, on the inner end of which is mounted a lever 131 connected to a pitman 132 which in turn in connected to a lever 133 pivoted at 134 on the bracket 135. The lower end of this lever 133 is formed in a yoke 136 which engages a pin 137 on the end of a shifter rod 138 of the control mechanism 17 of the hydraulic transmission unit. The details of this unit are of no importance as any form of electrical, hydraulic or mechanical transmission and speed reducer can be employed. The electric motor 10 is likewise controlled from a point adjacent the lever 129 through the button 139 which actuates the rod 140 that in turn rotates the switch member 141.

*Gear casing and gearing*

Referring particularly to Figures 6 and 15 to 22 inclusive, there will be found illustrated in these views the mechanism for selecting the drives for chasing threads through the operation of the lead screw and for the actuation of the carriage and cross-slide through the feed rod. With the mechanism of this gear box the operator utilizes the knob 142 in order to actuate a clutch hereinafter described so as to select either the lead screw or the feed rod to be driven. Thereafter he operates the quick change thread index knob or handle 143 with pointer 143b to selectively position the gearing in the gear box in order to change speeds, when that is desirable in connection with the operation of the feed rod. However, if the lead screw has been selected to be driven, then button 143 is used for the purpose of selecting the thread indicated in any one of the radial columns 144 of the dial plate 145 on the upper half of the dial. Also, in the event of using the lead screw, button number 146 is used for the purpose of selecting the thread range of the thread to be chased, which range is indicated in any one of the concentric columns "A," "B" or "C" indicated at 147.

It will be understood that, as heretofore described, the belt 30 driven by the spindle 28 through the sleeve 29 actuates the feed rod through the pulley 31. This is the belt driven power source for the feed rod which does not need to be as accurate in its feeding as the feed of the lead screw. Similarly, the spindle 28 drives through the multiplying pick-off gears 52 to 58, providing a direct drive through gearing that is extremely accurate for actuating the lead screw. This also has the further advantage that the driving gears for the lead screw are not uselessly employed and worn when driving the feed rod.

By actuating the knob 143 and moving its pointer 143b over the lower half of the dial, the speed of the belt feed can be selectively determined by selectively positioning the gearing hereinafter described in order to change the gearing speeds. The lower half of the dial for this purpose is designated 148. It is provided with radial columns 149 and concentric columns 150, 151 and 152.

The lead screw is designated 153 and the feed rod 154.

The actuation of the knurled knob 142 clockwise (if viewed from the position of Figure 22, but counter-clockwise if viewed from the position of the operator of the lathe) results in selecting the lead screw through which the carriage will be driven so as to feed the carriage to chase threads. This is effected through the shaft 155 which has the elongated pinion 156 engaging with the circular rack 157. The actuation of this circular rack results in moving the shifter fork 158 actuating the clutch member 159 so as to bring the clutch teeth 160 and 161 into engagement with one another, thereby bringing into operation the drive through the gears 52 to 58, the latter being on shaft 59.

The gear 162 has formed with it and as a part of it the annular shoulders 159a, the space between which forms a groove for the reception of the shifter fork 158. The drive from pulley 31 through shaft 32 and gear 163 to gear 162 imparts motion to the shaft 164 because the gear 162 is splined thereto. This gear 162 can slide longitudinally of the shaft 164 but must rotate with it. When it is moved to the left (Figure 19), the teeth 160 engaging with the teeth 161 of the clutch member 165 thereby connect the shaft 164 to the drive through gear 58 which is connected to the shaft 59 on which the clutch member 165 is mounted. In this manner the drive through the gearing from 52 to 58 drives the shaft 59 and the shaft 164, in turn actuating the elongated pinion 166.

The right-hand end of this pinion is mounted in a ball bearing 167 that is carried within the enlarged end of a sleeve 168 cut away at 169 which surrounds the elongated pinion 166. This sleeve serves as a support for the tumbler arm 170 that slides thereon and pivots thereon. This tumbler arm 170 carries a cross pin 171 in ball bearings 172. Mounted on this pin through the medium of the ball bearings 172 is the tumbler gear 173. This gear is in constant mesh with the elongated pinion 166 through the cutaway portion 169 of the sleeve 168. It is adapted to turn with the elongated pinion and to slide along the pinion. This gear 173 and the tumbler arm 170 are shifted back and forth by the shifter fork 174 which is connected to the rack 175, which in turn engages the pinion 176. I will return to a description of the operative mechanism embodying the yoke 174 and associated parts when describing the quick change thread index handle 143 and the operation of the parts associated with it.

Returning now to the elongated pinion 166 which is being driven by the shaft 164 through the gears 52 to 58 for the purpose of driving the lead screw for chasing threads, the gear 173, which is always in mesh with the elongated pinion 166 engages with one of the cone gears of the speed changing system designated 178. There are a series of such gears designated 178, 179, 180, 181, 182, 183, 184, 185, 186, 187 and 188. The gear 173 is adapted to engage any one of these gears except the last gear 188. These gears turn with the shaft 189 to which they are affixed. The particular gear which gear 173 would engage of this series of change speed gears 178 to 187 depends upon the operation of the handle 143 which will be explained hereinafter. Assuming for the moment that it is in engagement, as shown in Figure 22, with gear 178, gear 190 is in engagement with gear 178.ABear 190 is freely mounted on shaft 191. The gear is also provided with a clutch tooth 192 that is adapted to engage with the clutch tooth 193 of gear 194 that is fixed to and turns with shaft 191 and is adapted to reciprocate thereon. This is arranged through the use of a key 195 operating in the spline way 196. On this shaft 191 is mounted freely the gear 197 which meshes with the gear 188. On the end of the shaft 191 is fixed the gear 198 that in turn meshes with the feed rod gear 199 that is mounted on the feed rod 154.

Returning to the gear 194, it will be observed that it is constantly in mesh with the elongated gear 200. This gear has a clutch tooth 201 adapted to engage with the clutch tooth 202 of the circular rack 203 which is mounted upon the lead screw 153, reciprocates on the lead screw, and turns with it due to the key 204 in the keyway 205. The gear 200, however, turns freely on the lead screw shaft 153.

Therefore, when the handle button 142 is turned to bring the gear drive into operation through closing the clutch members 160 and 161, as heretofore described, the rotation of the shaft 155 will bring the circular rack 203 into clutching engagement with the gear 200 so that the lead screw is driven. It will be noted that at this time the feed rod 154 is also being rotated by reason of its driving connection through gears 198 and 199 with the shaft 191. Normally, this rotation of the feed rod is not utilized; that is, when the operator has so set the gearing as to drive the lead screw, he utilizes the lead screw only for moving the carriage, and permits the feed rod to rotate idly. However, if he desires to operate the carriage or cross feed from the feed rod at a speed slower than could be obtained in the usual way, he may do so by setting the gearing for driving the lead screw as described above, and then taking the drive from the feed rod at the apron controls. This provides a coarser range of feeds, in addition to the feed range shown on the dial plate 148.

The speed of the driving gear 200, and consequently of the lead screw 153, is changed in two ways. The first way is to change the position, as hereinafter described, of gear 173 with respect to any one of the gears 178 to 187 inclusive. The result of changing the position of 173 with respect to the cone gears is to select any desired speed in the radial portions 144 of the dial 145. For instance, on the left-hand side of the upper portion of the dial, it is possible to select by this shifting of 173 any one of the radial positions 144, of which there are ten on the upper half of the dial. There are also ten on the lower half of the dial which likewise can be selected in connection with the feed rod drive hereinafter explained.

If, however, you wish to select a particular concentric range such as A, B, A, B, C in the column 147 on the upper part of the dial, then the manipulation of the range selector 146 to determine the number of threads per inch is effected.

Before proceeding with the description of this selector operation, the following is a description of how the gear 173 is moved from gear 178 to gear 187 or any intermediate gear.

The handle or knob 143 which is known as the "quick change thread index handle" is first pushed inwardly. This is accomplished, as will be seen from Figure 18, by having a sleeve 206 to which the handle 143 is attached. There is a slot 207 in this sleeve in which extends the cross pin 208 mounted on the end of the slide shaft 209. This movement is resisted by a helical spring 210 between a cam head 211 on the sleeve 206 and the gear 212. The purpose of this spring is to maintain the sleeve 206 normally in its outer position. However, when the handle 143 is positioned inwardly with the sleeve 206, the wall of the slot 207 engages the cross pin 208. The inward movement of the cam 211 actuates the cam follower head 213. This head 213 is on the arm 214 fixed to the arm 215 of a bellcrank pivoted at 216, the other arm of which lies behind the hub 218 of the gear 219 which is fastened by the pin 220 to the shaft 221.

In operation, the arm 217 starts at a position against the end of the hub 218 as shown in Figure 18. The inward movement of the sleeve 206 depresses the arm 217, allowing the shaft 221 with the gear 219 to shift that gear to the right hand. Now having permitted the gear 219 to move to the right hand under the influence of the helical spring 222 which surrounds the shaft 221 at its left hand end, the following operations take place. The spring 222 spreads the two halves of the tumbler positioning plates designated 223 and 224, which plates have cutaway cam faces (see Figures 22 and 17) and between which spaces generally designated 225 and 226 is the ball 227 on the pin 228, which pin 228 is mounted in the tumbler arm 170. The action of the spring 222 is to spread these halves of the tumbler cam plate 223 and 224, thereby permitting free movement on the part of the ball 227. It will be understood that the half 224 is free to move with respect to 223, which is anchored.

This permits the ball 227, pin 228 and tumbler arm 170 to rotate about the center of the gear 166 due to the pull of the spring 229, which is anchored at one end to the tumbler arm 170 at 230 and at the other end to a fixed abutment 231. The result of this is to carry the tumbler gear 173 which is pivotally mounted on the tumbler arm 170 away from the gear 178 or any other gear from 178 to 186 with which it might have happened to be in engagement.

Gear 173 is now free to be shifted laterally for engagement with a new change speed gear. To do this the handle 143 is turned to rotate the sleeve 206 and the shaft 209. This results in rotating the gear 212 which is fixed to the shaft 209. The gear 212 is in mesh with the gear 219 that is fixed to the shaft 221. On this shaft 221 is the pinion 176 which engages with the rack 175 on which is carried the shifter fork 174. The rotation of the shaft 221, therefore, results in the lateral movement of the shifter fork 174 which carries with it the disengaged gear 173 to a new change speed gear engaging position.

The gear 173 now being in its new position opposite the desired change speed gear, the handle 143 is pulled out in order to push the gear 173 into engagement with one of the gears 178 to 187 that is selected. This is accomplished by having a circular rack 232 on the shaft 209 engaging with a pinion 233 which is freely mounted on the lead screw 153, which merely serves as a carrier of convenience. This gear 233 in turn engages the circular rack 234 on the shaft 221, thereby pushing it to the left-hand (see Figure 18) against the spring 222. The gear 173 is now engaged with the desired change speed gear. Another result of pulling the handle 143 out is to restore the lever of the bellcrank marked 217 into its uppermost position, as shown in Figure 18, because at this time the outward pull has restored the gear 219 and the cam 211 to the position shown in Figure 18.

When the handle 143 was rotated, as heretofore described, this rotated the shaft 221, on the forward end of which in the right hand of Figure 18 is the gear 235 which meshes with the gear 236 that is fixed by the bolts 237 to the pointers 143a and 143b, so that the pointers would be rotated at a proportionate speed and distance necessary to indicate the desired reading, indicating what had been done as a result of the movement imparted to the mechanism.

We now pass to the description of the operation and mechanism for the range selector to determine the number of threads per inch that will be chased as a result of the operation of the lead screw. This is also employed in connection with the feed rod, but that will be covered by a later explanation.

Turning to Figure 6 and the upper half of the dial 145, the handle 146 is used for positioning the mechanism in order to select which one of the concentric areas A, B, A, B, C, it is desired to select, as each of those ranges will determine the number of threads turned per inch of the work.

The operator rotates the handle or knurled button 146 which is mounted on the shaft 238, on the end of which is carried a pinion 239 engaging with a rack 240 on the rod 241. This rod is connected to the shifter fork 242 by a set screw 243 and a key 244 engaging in co-operative keyways the shaft 241 and the shifter fork 242. The arms of this fork engage with the sides of the gear 194 for moving it so that it either clutches the gear 190 through the clutch teeth 192 and 193 or it is moved in the opposite direction to engage the gear 197 through the clutch teeth 245 and 246. If the handle 146 is turned clockwise, as viewed from the outside of the machine, the gear 194 will be clutched to the gear 190. This results in the selection of the C range on the dial 145. If the gear 194 is left in unclutched position and also in mesh with gear 184, then the inner range B is selected on the dial 145. If the gear 194 is clutched by a reverse movement of the handle 146 to the gear 197, then the range of the innermost A range on the dial is secured. The outer ranges A and B on the dial are selected in the same manner but only when the gears 58 and 52 have been exchanged, taking each other's places and thereby changing the gear ratios.

As indicating what to do in this connection of shifting the gear 52 from the stud position to the box position of gear 58 (see Figure 15), the dial provides the spaces 247 and 248. If you desire to operate within any one of the inner ranges, reading from the center of the dial C, B, A, then you put the gear 52 in the stud position and the gear 58 in the box position as indicated at 248 on the dial. The numeral 24 under the word "Stud" refers to the number of teeth on the gear 52 and the numeral 48 under the word "Box" refers to the number of teeth on the gear 58. However, if you wish to select the outer ranges A and B on the dial, then you move the 24-toothed gear 52 to the box position where gear 58 is located (Figure 15) and then move the gear 58 with its 48 teeth into the stud position formerly occupied by gear 52. In the stud position the gear is mounted on shaft 48 and in the box position it is mounted on the shaft 59. The reason that the stud and box space is placed where it is on the dial 145 is because such a space occurs between the change speed gears 184 and 185.

We now turn to a description of the change speed gear mechanism as operated in connection with the drive of the feed rod and also a description of the range selector as indicated in connection with the feed rod, which positions and feeds are indicated on the lower half of the dial marked 148.

The operator grasps the handle or knurled knob 142, turning it clockwise as he stands in front of the machine or counter-clockwise as viewed in Figure 22. The purpose of this is to rotate the shaft 155, move the rack 157, actuate the shifter fork 158 and de-clutch the gear 162 from the driving gear 56, placing the gear 162 in mesh with the belt driven gear 163. The train of gears 52 to 58 and also the headstock gearing are thus rendered inoperative to drive the lead screw. The complete stopping of these gears is accomplished by moving the button 72 until the pointer 75 is opposite the space marked "Feed." This effects the movement of the clutch 35 into its intermediate, inoperative position, breaking the driving connection between the spindle 28 and the headstock and end gears 41, 43, 47, 63, 66, 52, 53, 55 and 58. This saves wear upon them, the noise of operating them, and the vibration from the momentum of the mass of these gears travelling at speeds as high as 2500 R. P. M.

The result of connecting gears 163 and 162 is to drive shaft 164 from the belt 30, which in turn drives the elongated gear 166 that is in mesh with tumbler gear 173, that in turn is engaged with any one of the gears 178 to 187 as heretofore described. It will be noted that the same change speed gear mechanism is utilized for the feed rod as for the lead screw.

Likewise the same range selector 146 is utilized for shifting the gear 194. The gear 194, in its intermediate position as shown in Figure 22, is in engagement with gear 184 which is driven through gear 173 and any one of the change speed gears except 188. In the event that the gear 194 is shifted out of engagement with gear 184, then the drive from 173 is through the shaft 189 and the gear 188 affixed to it and thence to the gear 197 in mesh with it, whence the shaft 191 is driven and the gear 198 meshing with the gear 199 on the feed rod 154 drives the feed rod.

On the other hand, if the gear 194 is out of engagement with the gear 184 and has been moved into clutching position with the gear 190, the drive to the shaft 191 will be through gear 173, shaft 189, gears 178 and 190, shaft 191, gear 198, gear 199, and feed rod 154.

The ratio of gears 190, 194 and 197 is in proportion of four, two and one. This geometric progression is indicated on the upper half of the dial 145 as to the progression between the figures in the different ranges read radially. This is also true of the lower half of the dial 148. The three ranges C, B and A are selected, as heretofore described, with respect to the upper half of the dial on the three inner ranges. When gear 194 is in engagement with gear 190, the parts are in the inner C (152) range. When the gear 194 is in its intermediate position, as shown in Figure 22, it is in the B (151) range. When gear 194 is clutched with gear 197, then the A (150) range is utilized.

The selection of the radial group of figures on the dial is effected by placing the pointer 143b opposite the radial portion of the dial indicated for any radial portion by the numeral 149. This is effected by moving the handle 143. This indicates the speed selection for any given range. When the lower half of the dial is to be utilized, the operator must set the knob 72 known as the "lead screw reverse knob" so that the pointer 75 is in the feed position, which means that the gears 52 to 58 and the associated headstock gears are rendered inoperative, as heretofore described, because the clutch 35 is placed in neutral position in the headstock gearing. The space on the dial 148 in which this legend "Set lead screw reverse knob to feed" occurs is due to the space between gears 184 and 195. As indicated on the dial half 148, the belt feed is indicated by the numerals in thousandths per inch, while the numerals on the upper half of the dial indicate the number of threads per inch that are chased on the work.

With reference particularly to Figures 1, 6, 16, 18 and 60, it will be noted that the gear casing is a separate, independent casing having a bottom 249, a front wall 250, a cover plate 251 on the front wall, a top 252, a rear wall 253 and end walls 254 and 255, with a cover or lid 256. One of the features of advantage in this invention is the provision of a complete unitary gear casing which is provided with abutting faces 257 and 258 against corresponding faces of the lathe bed designated 259 which has the usual flats 260 and 261 and the V guideways 262 and 292.

This gear casing is bolted to the bed by the upper bolts 262 and the lower bolts 263. By removing these bolts, the gear casing can be removed in its telescopically arranged position within the bed as indicated in dotted lines in Figure 60. The front wall of the gear casing or box 250 is provided with a passageway 264 which is closed by a sight glass 264a so that the level of the oil in the gear casing can be readily observed.

Base

The base, which has a floor 1 and feet 2, has been described with respect to the housing for the electric motor 10, oil reservoir 11, and the hydraulic speed reducer and transmission 15 in connection with the housing of this apparatus in the enlarged compartment 9. The base opposite the position where the operator sits is of reduced section, as will be seen in Figure 5, providing a space for the operator's knees when he sits on a stool in front of the lathe. His knees are accommodated in the space designated 265, which is formed by the side wall 266 of the enlarged portion of the base containing the aforesaid mechanism.

The front wall of the base in this recessed area is formed by a diagonal upper portion 267 and a lower vertical portion 268 which is provided with a door 269 having racks 270 for carrying collets 271 and other small parts which may be either stored on the rack or on the base compartment 272. Above this compartment is a cutting lubricant sump 273 into which cutting lubricant drains through the screen 274 from the compartment 275, the sides of which are formed by the inclined walls 267 and 267a. The cutting lubricant drains into the sump 273 from the chip pan 276, as will be seen in Figure 1, where the dotted lines at 277 show the bottom of the chip pan which is in open communication at 278 with the compartment 275.

The circulating pump 279 for the cutting liquid is located in a compartment 280, the top of which is the inclined wall 267a, the back of which is the wall 280a forming one wall of the sump 273 and the bottom of which is designated 281. The front of it is closed by the door 282. This door is provided with ventilation slots 283 which are covered by spaced strips 284 mounted on spacer supports 285.

The top of the base is formed in depressed portions having a bottom 286, side flanges 287, and internal flanges 288, terminating in a lathe bed foundation in the shape of raised platform 289 to which the bed 259 is bolted by the bolts 290. This leaves a trough 291 for collecting cutting lubricant, chips and the like.

Lathe bed

The lathe bed is an independent casting, the upper surface of which is formed with flats 260 and 261 that are flame hardened, a rear V-way 262 and a forward V-way 292. These V-ways are also flame-hardened, as indicated in Figure 63. The important feature of novelty of these V-ways is the combination with the hardened surface of an angle less than 90 degrees to eliminate the tendency of the carriage to lift. The increased friction resulting from an angle less than 90 degrees is compensated for by the hardening of the surface of the ways.

In order to retain the carriage on the lathe bed in cooperation with this anti-lifting angle of less than 90 degrees, the following construction has been provided.

Anti-friction gibs

By referring to Figures 5, 25 and 31, the nature and construction of the anti-friction gib way mechanism will be seen. On the underside of the bed 259 beneath the V-way 292 on the front of the bed and beneath the flat way 261 on the rear of the bed, there are provided flat surfaces 293 which are engaged by a roller 294 mounted on a ball bearing 295 on the end of a shaft 296 that is retained in position by a collar 297 and a head 298 in the apron 299. The periphery of this head 298 is formed with teeth 300 engaging similar teeth 301 on a small collar 302 and is retained in position by a set screw 303 on the ways of the apron 299. By loosening this set screw and rotating the shaft 296 by inserting a screw driver or other tool in the slot 304 of the shaft 296, the eccentric head of the shaft 296 at 305 is also rotated. As this head carries the ball bearing 295 and the roller 294, the vertical position of the roller is adjusted for wear so as to retain the carriage 306 on the ways 262 and 292, as well as the flats 260 and 261, as desired. The apron 299 is bolted by the bolts 307 to the underside of the front of the carriage 306.

Apron construction

When the carriage is to be clutched to the lead screw 153, the lever 308 is moved to the right (see Figure 25). This results in turning the shaft 309 (Figure 36) which is pinned to the handle 308 by the pin 310. This shaft has an enlarged bearing member 311 fitting in the face of the apron in a hole 312, the back of which is engaged by a cutaway collar plate 313 which is cutaway at 314. This cutaway face is adapted to engage the pin 315, as seen in Figures 38 and 39. This is a stop pin. The arms 316 and 317 are connected to the respective halves 318 and 319 (Figure 35) of the nut which engages the lead screw 153 to clamp it. The halves 318 and 319 are mounted on plates 320 and 321 that are guided on guideways 322 and 323 in the apron. Mounted in these plates 320 and 321 are bolts 324 and 325 which are in turn mounted in the arms 316 and 317. These arms 316 and 317 are also pivotally mounted on the collar plate 313 as at 324a and 325a respectively. Thus the rotation of the shaft 309 by the handle 308 will open and close the clamping nut halves 318 and 319.

There is also provided an interlock between the lead screw half nut clamping mechanism and the connection, to be hereinafter described, of the apron to the feed rod 154. This interlocking mechanism is constructed and operates as follows.

In the first place, its purpose is to lock the transmission gears between the carriage and the feed rod in neutral so that no power can be transmitted from the feed rod when the half nut construction is in closed, clamped position in order to secure movement from the lead screw. With this object in mind, it will be noted that the lower half of the clamping nut designated 319 and its plate 321 are connected through the plate 321 to the pin 326 which operates in a cam slot 327 (see Figures 33, 34 and 37) so as to move the locking plate 328 in which said slot is located so that this plate will enter a groove 329 in the shifter slide rod 330 to prevent it from moving and to retain it in a neutral position. This slide rod 330 has a fork 331 extending between the gears 332 and 333 to retain those gears in their neutral position even though they are rotating due to the fact that they are fastened to the shaft 334 on which is keyed the worm wheel 335 that is driven by the worm 336 on the feed rod 154. Therefore, as long as the half nuts are clamped on the lead screw, the gears 332 and 333 are ineffectual for any driving purposes.

Likewise, when the gears 332 and 333 have been moved in unison with the shifter rod 330 by the handle 337 (see Figures 30 and 32), it is impossible for the half nuts to be clamped because they are held open by the plate 328 engaging the surface of the slide rod 330. The handle 337 is for the purpose of connecting the apron and carriage to the feed rod for forward or reverse movement, or for rendering the movement of the carriage inoperative by bringing the gearing to neutral position.

To accomplish this object, the handle 337 is mounted upon a gear shifting rod 338 which slides within the bore 339 of the sleeve shaft 334. The sleeve shaft 334 is provided with slots 340 through which projects a pin 341 that is carried upon the rod 338. This pin extends into a reverse gear 342 and into a forward gear 343. The reverse gear 432 meshes with the pinion 344 on the stub shaft 345, which in turn engages the gear 346 which is an elongated gear.

When the gears 342 and 343 are in the position shown in Figure 30, they are in their neutral position. The movement inwardly of these gears places the gear 342 in mesh with the pinion 344. The movement of gear 343 outwardly places it in mesh for forward driving with the gear 347. Gears 346 and 347 are keyed together to rotate as a unit on a common shaft 347a.

The shaft 334 is mounted in sealed ball bearings 348 and 349, so that lubricant may be retained within the chamber. The positioning of the shaft 338 is determined by the spring pressed detent 350 in the notches 351, 352 and 353.

The elongated gear 346 engages with the clutch gear 354, as will be seen in Figures 27 and 28.

This gear 354 is integral with a sleeve 355 journaled within a housing 356 mounted in the front of the apron. Within this housing is a cam operated mechanism which operates as follows. A cross feed handle 357 is pivoted at 358 upon a supporting plug 359 mounted in the housing 356. Upon the shaft 358 is mounted a cam 360 which engages with the thrust plate 361, which in turn engages a ball bearing 362 that is mounted within the end of the sleeve 355 of the gear 354. The rotation of the cam 360 will result in compressing the helical spring 363, the other end of which rests against the ball bearing 364 that in turn engages a clutch member 365 which has a tapered face 366 adapted to engage in clutching engagement a corresponding clutching face 367 on the interior of the gear 354. When this clutch is closed by the actuation of the cam 360 against the spring 363, then the drive is completed through the following gear train: the gears 346 and 354, the clutch just mentioned, and the gear 368 mounted on the clutch member 365. This clutch member 365 is rotatably mounted upon the shaft 369. The gear 368 engages with the gear 370 that is mounted upon a stud shaft 371. The gear 370 in turn meshes with a pinion 372 fixed to the shaft 373. The shaft 373 is a cross-feed shaft. This connection of the gearing results in feeding the cross side 374 across the lathe.

Now turning to the longitudinal feed from the feed rod, the gear 346 engages with the clutch gear 375. This gear is integral with a sleeve 376 mounted in the apron. Between the outer end of the sleeve 376 and an actuating cam 377 is a ball bearing 378. The cam is actuated by the shaft 379 and handle 380. This shaft is mounted in the end plug 381 within a sleeve 382.

The interior of the sleeve 376 of the gear 375 is engaged by a yielding spring 383, the other end of which bears upon a ball bearing 384 which engages with a clutch member 385 having an externally tapered face 386 adapted to engage in clutching engagement with the internally tapered clutch face 387 of the gear 375. This clutch member 385 is provided with a pinion 388 that is freely mounted upon the shaft 379. This pinion engages with a gear 389 which is keyed to the drive shaft 390 which carries a pinion 391 engaging the bed rack 392. This results in imparting longitudinal movement when the clutch faces 386 and 387 are in clutching engagement.

In the event it is desired to rack the carriage by hand, the handle 393 is moved by the operator to rotate the shaft 394 which has fixed to it a pinion 395 that also engages the gear 389 so that the shaft 390 and pinion 391 are moved in connection with the rack 392. The pinion 395 is mounted upon and turns with a short shaft 394 mounted in the oil-sealed bearings 396 and 397. This shaft carries a cam 398 used as a pump cam for actuating the pump bellcrank 399, the other end of which moves the pump piston 400 against the spring 401. This pump piston operates within the pump 402. This pump is for the purpose of lubricating the bearings in the apron and carriage and the lathe ways. It draws its supply of oil from the sump formed at 403 in the bottom of the apron and delivers the oil under pressure through a piping system. The outgoing pipe is indicated at 404.

Referring now to Figure 65, it will be seen that this pipe 404 leads to a distributor 404a, from which two pipes conduct the lubricant to a sump 404b and a second distributor 404c. The sump 404b is formed in the apron 299, as will be seen in Figure 33. From this sump will be seen three pipes for the purpose of conducting lubricant to the lead screw half nut 318 and to the bearings at either end of the feed rod worm 336. From the distributor 404c there are provided pipes for oiling the rear flat 261 of the lathe, the front V way 292, both sides of the cross slide dovetail 408, and the bearing of cross feed shaft 373.

It will be noted that not only is this pump actuated when the hand handle 393 is operating, but also it is continuously operated when the clutch surfaces 386 and 387 are closed for power operation.

It will be noted that the caps 359 and 381 are threaded in the respective supporting sleeves 356 and 382 so that the assembly can be adjusted inwardly to adjust for wear on the clutch faces. The shaft 405 (Figures 33 and 38) is driven by the worm 406 which engages the lead screw 153. The top of the shaft carries a thread chasing dial 407.

Cross-slide and measuring mechanism

The cross slide 374 mounted upon the usual dovetail 408 is moved transversely of the lathe as heretofore described through the actuation of the shaft 373 which carries the hand cross-feed handle 409. The slide 374 itself carries pointers 374a which register with the top slide angle setting dial 410. This dial is carried on the swivel 411 in which is dovetailed the tool or top slide 412. 413 indicates the tool post collar carrying the tool post 414. This tool post 414 has mounted on the top thereof the pivoted lever 415 which is mounted upon a cross shaft 416 in a jaw 417 at the top of the tool post 414. Between these jaws and formed as a part of the lever 415 is a cam 418 having a very slight angular face so that it is non-reversible. This cam bears upon a pin 419, the lower end of which at 420 engages with and locks a tool 421. The pin, when released from the cam pressure, is moved upwardly by a helical spring 422. The advantage of this lock is not only the speed of locking but the fact that it firmly positions the tool in the desired position and does not displace it during clamping, which has been true of rotary clamps.

The top slide is provided with the usual dovetail, the male portion of which is indicated at 423. The rotation of the handle 424 operates a shaft in the usual manner, which forms no part of this invention. 425 is a micrometer dial for measuring this movement.

Returning to the cross-slide, one of the features of my invention is the provision of a direct reading micro-gauging dial. The usefulness of this measuring dial combination is in connection with, for instance, turning a work piece of several different diameters. A typical illustration of how these dials work is as follows. The operator sets up his tool and takes a preliminary cut on the work. He then measures the cut with a micrometer and then sets up by hand against this calibration the two dials 426 and 427. The dial 426 is in inches and fractions of inches and the dial 427 is in thousandths. These dials are then set to the reading that he has determined on a micrometer by a manual measurement of the cut work piece. This results in giving him the diameter of the work before any further cutting takes place. This eliminates any further measuring of the work piece with reference to the successive cuts of different diameters that are taken thereafter on the work piece.

The operator now desires to set his tool for the next cut. He has loosened, in adjusting his dials, the clamping screw 428 actuated by the thumb piece 429. This screw engages the hub 430 of the thousandths dial 427. This has been loosened so he can rotate manually the two dials to bring them to the diameter of the first cut of the work piece. He then clamps the clamping screw 428 by moving the thumb piece 429. This connects the dial 427 through the bracket 431 to the cross-feed shaft 373. He then rotates the shaft 373 by the handle 409 until the reading on the two dials is the reading indicating the cut desired for the next cut on the work piece.

The dials are moved mechanically in the following manner for that purpose. The first dial 427 is, of course, rotated by reason of its direct connection to the shaft 373 by the rotation of the shaft. The second dial is rotated by the shaft 373 through a gear 432 which is keyed to the shaft 373 by the key 433. This gear meshes with the gear 434 which is mounted on the shaft 435 carrying the gear 436, which in turn meshes with the gear 437 that is mounted on the shaft 438. This shaft 438 carries the pinion 439 that engages with the gear 440 on the shaft 441 that carries the pinion 442 that meshes with the large gear 443, which is a ring gear integral with the barrel 444. Around the barrel 444 is mounted a ring 445 that is attached by set screws 446, one half of which is threaded in the respective barrel and ring 444 and 445. The ring 445 carries the inch dial 426. Mounted in the ring 445 is a spring pressed segmental shoe 447. The springs 448 at either end serve to press it outwardly against the inside of the dial 426, permitting that dial to be moved on the ring 445, and after it is moved, to be held frictionally in position. The shoe 447 has a V-shaped top 449 in order to position the dial 426 longitudinally.

Thread chasing stop

In order to provide means of limiting the inward movement of the cutting tool as far as the movement of the cross-slide is concerned, I provide a thread chasing stop which is contained within the same assembly as the indicating dials heretofore described.

This stop member 450 having a shoulder 451 is moved inwardly and outwardly by the knurled head 452 which can rotate this stop on the threads 453. The pin 454 limits the outward movement of the stop by engaging the shoulder 451. The inner end of the stop at 455 engages with the lug 456 on a plate 457 freely mounted on a hub 458 which is keyed by the key 459 to the shaft 373. A companion plate also freely mounted is designated 460. This plate is provided with a lug 461 for engaging with the lug 456. A plate 462 having a lug 463 engaging the lug 461 is pinned by the pin 464 to the sleeve 458. The purpose of this is to permit approximately three revolutions of the shaft 373 so that the tool may be withdrawn, moved laterally, and then restored to its original inner position before the stop 458 is engaged. This limits the position of the tool with respect to the cut to be taken and any deeper cut is adjusted by actuating the handle 424 for moving the top or tool slide.

Taper slide adjustment

This lathe is provided with a taper attachment which is supported on the bracket 465 which is mounted by bolts 466 on the carriage 306. This attachment consists of a supporting plate 467 in which is mounted a bracket table slide 468. This slide slides on the roller bearings 469 carried in the table 467 that moves with the carriage 306. The bracket table slide 468, however, is retained in the stationary position due to its being anchored by the rod 470 to the bracket 471 mounted on the lathe bed rear flat 261. Mounted on the carriage 306 is a bridge 472 having a slot 473 for receiving the pivot 474 of the swivel 475 that is adjusted angularly by the adjusting bolts 476 operating in the slots 477 of the bracket table slide 468. The end of this swivel is provided with a segmental rack 479 which in turn engages the pinion 480 which meshes with the pinion 481, both supported within a bracket 482. The second pinion 481 is actuated by a worm 483 on the shaft 484, which is moved by the knurled head 485. The worm 483 meshes with the worm wheel 483a which is fixed to the pinion 481 by the pin 483b and screw 483c. This mechanism comprises the vernier angle setting mechanism for the swivel. It is shown more completely in Figures 49 to 51.

At the other end of the swivel 475 is a bezel 486 with a bezel ring 487 retaining a cover plate 488 over the magnifying glass 489 so as to read scales at 490 marked on the surface of the bracket slide 468. Thus, by actuating the hand wheel 485, the angular adjustment of the swivel can be measured in inches per foot or degrees.

The swivel 475 is provided with a recessed body, as will be seen in Figure 52, in which is mounted a shoe 491 that is guided in its reciprocation within the depression in the face of the swivel 475 by the engagement of the rollers 492 with the sides of the depression in the face of the swivel 475, which sides are indicated at 493. In order to take up the wear that occurs, these rollers 492 are mounted on ball bearings 494. The bearings in turn are supported on stub shafts 495 and 496. The stub shaft 495 is eccentrically mounted in the shoe 491. On the end of this shaft 495 is a toothed head 497 with a slot 498 so that the shaft can be rotated. The teeth on this head 497 engage with those on a corresponding head 499 which is locked in position by the locking screw 500.

The rollers 469, 469a and 469b are adjustable, as will be seen from Figure 53. Each roller bearing is mounted upon an eccentric pin 501 which carries the roller 502. The rotation of this pin will change the position of the roller with respect to the surface which it engages in order to take up wear. The roller bearing 469c does not have this adjustment.

Tailstock construction

With reference to Figures 40 to 46, the tailstock consists of a bed casting 503 that slides upon the bed 259 and is guided by the V-way 262 and the flat way 260. There depends from the bottom of this bed casting 503 bolts 504 and 505. These bolts guide a clamping plate 506. The upper movement of this plate towards the bottom of the base 503 is resisted by the helical springs 507 and 508. The center of the plate 506 is provided with two openings 509 and 510 in which are mounted hardened steel studs 511 and 512. These studs are engaged by studs 513 and 514, the lower ends of which project into openings 515 and 516 in the clamping arm 517 that is pivoted at 518 to a supporting post 519 threaded into the base of the main tailstock casting 520.

The other end of this clamping arm 517 terminates in an eye 521 that is mounted on a bolt 522 which carries clamp nuts 523 and 524. This bolt at its upper end is eccentrically mounted on the shaft 525 upon an eccentric cam 526 on that shaft by means of a strap 527. This strap is a part of the bolt 522. The shaft 525 is provided with a collar 528 on one side of the strap 527 and with a sleeve 529 on the other side, which sleeve acts as a bearing sleeve in the tailstock casting 520. The other end of the shaft 525 is mounted in a similar bearing sleeve 530 for supporting the left hand end of the shaft 525. The right hand end of the shaft has mounted thereon an actuating handle 531.

The casting 520 is adjustable laterally of the bed 503 through the slide 532. This is effected by the operation of the screw bolts 533 and 534 working in the ears 535 and 536 in the base of the casting 520. The bolts themselves are mounted in the base casting 503. In order to permit this movement, slots are provided in the base casting 503 at 537 for the pin 519 and a slot is provided in the base casting at 538 for the pin 522. The base casting 503 is also provided with wiper retainers 539 and 540 containing wiper material 541 for wiping the bed of the lathe.

The remainder of the mechanism in this tailstock forms no part of this invention and need not be described in detail.

The lubrication system, however, is of importance in this connection. Lubricant is introduced through the opening 542 when the plug 543 is removed. The lubricant fills the pocket 544 and runs down through the passageway 545 to the bed way beneath the base casting 503. Likewise the tube 546 conveys the lubricant to the V portion of the bed way at 262. In both cases longitudinal grooves 547 and 548 convey the lubricant longitudinally from these feed passageways.

*Summary of operation*

The electric motor 10 is started by turning the switch button 139. The direction of the drive of the motor is determined by the position of the lever 129 that controls the hydraulic transmission 15 through the control box 17. The speed of the shaft 16, which is a driven shaft on the output side of the hydraulic unit 15, is controlled by the hand wheel 19.

The headstock gearing is controlled by the handle 72. If it is placed with the pointer 76 opposite the "feed" at 77, then the drive is to the feed rod through the belt 30 which may be driven either forwardly or reversely, depending upon whether the handle 129 is thrown toward the "forward" or "reverse" position on its dial. If the handle 72 is turned with the pointer 76 towards either position 78 or position 79 of the "lead screw" dial 80, then the lead screw driving gears 52, 53, etc., are rendered operative.

If the feed rod is to be actuated, then the handle 142 is moved as described to open the clutch members 160 and 161 to disconnect the lead screw driving gears 52 to 58 at the driven end of those gears, the driving end already having been disconnected by moving the button 72 so that the pointer points towards "feed" at 77. The handle 143 is then moved so that the pointer 143b points to the particular part of the dial indicating the belt feed in thousandths per inch desired, that is, it is turned to select the particular change speed gear 178 to 187 with which the tumbler idler gear 173 is to engage. The handle 146 is moved as a range selector to actuate the range selector gear 194 so that any one of the ranges "A," "B," or "C" at 150, 151 or 152 can be selected. Therefore, the speed, range and direction of feed of the feed rod is controlled.

On the other hand, if the lead screw is to be actuated, the handle 72 is moved to point to the lead screw at either 78 or 79, and the handle 142 is moved to connect the clutch 160—161 to connect the driving gears 52 to 58 to the shaft 164, the gear 52 having been connected by the movement of the handle 72 to the driving spindle 28 through the headstock gearing. The handle 143 is moved so that its pointer 143a selects the change speed gear 178 to 187 to be engaged by the tumbler idler gear 173 in order to determine the speed of the lead screw in the chasing of threads. The handle 146 is moved to actuate the range selector gear 194 to move it to the selected range "A," "B," "A," "B" or "C" as heretofore described.

The lead screw and feed rod are connected to the apron of the carriage by the half nut handle 308 connecting the carriage to the lead screw or the handle 337, which controls the direction of movement of drive of the feed rod of the carriage. This is accomplished by the in-and-out movement of the handle 337. The selection of the drive of the feed rod for longitudinal movement is accomplished by the longitudinal feed friction lever 380 while the cross-feed friction lever 357 controls the connection of the feed rod for cross-feeding.

The adjustment of the taper slide is accomplished by adjusting through the knurled nuts and screw the shaft 470 which moves the bracket taper slide 468 longitudinally, while the swivel has its angularity adjusted by the micrometer adjusting head 485.

The tailstock is adjusted as to its longitudinal position on the lathe bed by the actuation of the handle 531. The details of adjustment of the tailstock spindle and quill are conventional and need not be described.

With reference to the cross-feed and the measuring apparatus associated therewith, the operation is as follows. The first cut is taken upon the work piece. This is accomplished by manual measurement of the work piece to determine the depth of the first cut. The diameter of the first cut is then indicated by moving the two dials to the measurement so taken on the first cut as the standard from which to depart in measuring subsequent cuts. Thereafter the handle 409 is actuated, after the clamp 428 has connected the dial 421 to the shaft 373, and the shaft is rotated so as to bring the cutting tool to a new position for cutting another cut, the diameter of which can be directly read on the two scales, based upon the calibration from the initial cut. In this manner it is unnecessary for the operator to successively measure these successive subsequent cuts but he can read the desired measurement direct from these dials, thereby greatly facilitating and speeding up his work.

It will be understood that I desire to comprehend within my invention such modifications as come within the scope of the claims and the invention.

Having thus fully described my invention, what I claim as new and desire to secure by Letters Patent is:

1. In a lathe, a driving motor, hydraulic variable speed transmission means driven thereby, a control mechanism comprising a handle, a sleeve and a system of links and levers connected to said hydraulic speed control mechanism and handle, a rod mounted within said sleeve, and electrical control mechanism connected to said rod for controlling said driving motor whereby a centralized control for said motor and said hydraulic speed mechanism is provided.

2. In a lathe, a headstock frame, a spindle mounted therein on spaced bearings, opposed gears rotatably mounted around said spindle and journalled in said frame, each of which gears has clutch means, a clutch means adapted to turn with said spindle and reciprocate thereon and to alternately engage said gears with said spindle, means for actuating said clutch means, a driven shaft, and gearing connected to said shaft and to said aforementioned gears on said spindle whereby said driven shaft is rendered inoperative or is driven in opposite directions according to the position of said clutch means.

3. In a lathe, a headstock frame, a spindle mounted therein on spaced bearings, opposed gears rotatably mounted around said spindle and journalled in said frame, each of which gears has clutch means, a clutch means adapted to turn with said spindle and reciprocate thereon and to alternately engage said gears with said spindle, means for actuating said clutch means, a driven shaft, gearing connected to said shaft and to said aforementioned gears on said spindle whereby said driven shaft is rendered inoperative or is driven in opposite directions according to the position of said clutch means, a lead screw, and gearing driven by said driven shaft adapted to drive said lead screw.

4. In a lathe, a headstock frame, a spindle mounted therein on spaced bearings, opposed gears rotatably mounted around said spindle and journalled in said frame, each of which gears has clutch means, a clutch means adapted to turn with said spindle and reciprocate thereon and to alternately engage said gears with said spindle, means for actuating said clutch means, a driven shaft, gearing connected to said shaft and to said aforementioned gears on said spindle whereby said driven shaft is rendered inoperative or is driven in opposite directions according to the position of said clutch means, a lead screw, gearing driven by said driven shaft adapted to drive said lead screw, and means of rendering said gearing inoperative to drive said lead screw.

5. In a lathe, a headstock casting having a forward bearing lubricant chamber, a central lubricant chamber and a rear bearing lubricant chamber, each of said chambers having independent means of supplying lubricant to the respective chambers, and at least a part of said chambers having means for indicating the quantity of lubricant therein, and a headstock spindle so mounted in said casting to intersect said respective chambers to have the mechanism associated with said spindle lubricated by the lubricant in said chambers.

6. In a lathe, a headstock casting having a forward bearing lubricant chamber, a central lubricant chamber and a rear bearing lubricant chamber, each of said chambers having independent means of supplying lubricant to the respective chambers, and at least a part of said chambers having means for indicating the quantity of lubricant therein, a headstock spindle so mounted in said casting to intersect said respective chambers to have the mechanism associated with said spindle lubricated by the lubricant in said chambers, and a bearing support for said spindle in the front and rear chambers.

7. In a lathe, a headstock casting having a forward bearing lubricant chamber, a central lubricant chamber and a rear bearing lubricant chamber, each of said chambers having independent means of supplying lubricant to the respective chambers, and at least a part of said chambers having means for indicating the quantity of lubricant therein, a headstock spindle so mounted in said casting to intersect said respective chambers to have the mechanism associated with said spindle lubricated by the lubricant in said chambers, a bearing support for said spindle in the front and rear chambers, and means for splashing lubricant in said intermediate chamber.

8. In a lathe, a headstock having a headstock spindle, a driven shaft parallel thereto, a pair of gears rotatably mounted on said spindle and journalled in said headstock, means retaining said gears against axial movement relative to said spindle, a pair of gears mounted on said driven shaft adapted to drive said shaft in opposite directions and in engagement with said gears on said spindle, and a clutch means adapted to connect the gearing on said spindle to said spindle alternately for driving said driven shaft in opposite directions, or in the neutral position of the clutch of rendering said driven shaft inoperative.

9. In combination, in a gear box for a lathe, of lead screw driven means, feed rod driven means, a driving means therefor, means of selecting which of said driven means shall be driven, a common driving gear, a common tumbler idler gear in mesh therewith, a plurality of change speed gears, means of moving said tumbler gear into engagement with said change speed gears, three range selector gears, clutch means between the intermediate of said three gears and either of the outside gears, said outside gears being constantly in mesh with the outside gears of the change speed gear assembly, a common shaft for said selector gears in driving engagement with said feed rod, a clutch gear on said lead screw, clutch means for engaging said gear with said lead screw, said gear being constantly in engagement with the intermediate selector gear, and means of moving said intermediate selector gear to be clutched to either of the outside gears of the selector gear assembly.

10. In a lathe gear box, a lead screw, means to drive said lead screw, change speed gearing, means of selecting said change speed gearing to determine the speed of said lead screw, range selector gearing comprising small, intermediate and large range gears, the largest and smallest of which gears are in constant engagement with the smallest and largest of said change speed gears and the intermediate range gear is adapted to selectively engage said largest or smallest range gear, means of moving said intermediate range gear, and gearing associated with said lead screw in constant engagement with said intermediate range gear.

11. In a lathe gear box, a lead screw, means to drive said lead screw, change speed gearing, means of selecting said change speed gearing to determine the speed of said lead screw, range selector gearing comprising small, intermediate and large range gears, the largest and smallest of which gears are in constant engagement with the smallest and largest of said change speed gears and the intermediate range gear is adapted to selectively engage said largest or smallest range gear, means of moving said intermediate range gear, gearing associated with said lead screw in constant engagement with said intermediate range gear, and means of connecting said lead screw gearing to the lead screw when said gear box is connected to means for driving its mechanism.

CLIFFORD A. BICKEL.